United States Patent
Fabijan et al.

(10) Patent No.: US 11,960,387 B2
(45) Date of Patent: Apr. 16, 2024

(54) SAMPLE RATIO MISMATCH DIAGNOSIS TOOL

(71) Applicant: Microsoft Technology Licensing, LLC, Redmond, WA (US)

(72) Inventors: Aleksander Fabijan, Bellevue, WA (US); Trevor Craig Blanarik, Seattle, WA (US); Kewei Chen, Bellevue, WA (US); Ruhan Zhang, Bellevue, WA (US); Adam Marc Gustafson, Seattle, WA (US); Venkata Kavitha Budumuri, Kirkland, WA (US); Stephen James Hunt, Bellevue, WA (US); Maxwell Campbell Caughron, Kenmore, WA (US); Vaibhav Kumar Bajpai, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 17/220,900

(22) Filed: Apr. 1, 2021

(65) Prior Publication Data
US 2022/0318128 A1  Oct. 6, 2022

(51) Int. Cl.
G06F 11/36 (2006.01)
G06F 11/32 (2006.01)

(52) U.S. Cl.
CPC ........ G06F 11/3688 (2013.01); G06F 11/328 (2013.01); G06F 11/368 (2013.01); G06F 11/3692 (2013.01)

(58) Field of Classification Search
CPC .. G06F 11/3688; G06F 11/328; G06F 11/368; G06F 11/3692
See application file for complete search history.

(56) References Cited

U.S. PATENT DOCUMENTS

| | | | |
|---|---|---|---|
| 2008/0189156 A1* | 8/2008 | Voda | G06Q 10/067 705/7.33 |
| 2020/0184344 A1* | 6/2020 | Dobrovolsky | G06Q 30/0202 |

(Continued)

OTHER PUBLICATIONS

Mattos, "Towards Automated Experiments in Software Intensive Systems" halmers Tekniska Hogskola (Sweden) ProQuest Dissertations Publishing, 2018 (Year: 2018).*

(Continued)

*Primary Examiner* — Wei Y Zhen
*Assistant Examiner* — Amir Soltanzadeh
(74) *Attorney, Agent, or Firm* — Ray Quinney & Nebeker; James Bullough

(57) ABSTRACT

A sample ratio mismatch (SRM) analyzer receives data from an online controlled experiment (OCE) and provides information to help determine a root cause of an SRM. The SRM analyzer may identify one or more segments in the data that include an SRM and may determine whether a triggered scorecard of the OCE includes an SRM. The data may include one or more scorecards. The SRM analyzer may determine whether each scorecard has an SRM. The SRM analyzer may test a difference in proportion of users assigned to treatment between a last scorecard without an SRM and a first scorecard with an SRM. If the difference in proportion is statistically meaningful, the SRM analyzer may determine that the SRM arose after the last scorecard. If the difference in proportions is not statistically meaningful, the SRM analyzer may determine that the SRM existed from a beginning of the OCE.

20 Claims, 8 Drawing Sheets

(56) References Cited

U.S. PATENT DOCUMENTS

| | | | | |
|---|---|---|---|---|
| 2020/0402013 | A1* | 12/2020 | Yeung | G06Q 10/1053 |
| 2022/0129372 | A1* | 4/2022 | Lindon | G06F 11/3006 |

OTHER PUBLICATIONS

Fabijan, "Diagnosing Sample Ratio Mismatch in Online Controlled Experiments: A Taxonomy and Rules of Thumb for Practitioners", KDD '19: Proceedings of the 25th ACM SIGKDD International Conference on Knowledge Discovery & Data MiningJul. 2019 pp. 2156-2164 (Year: 2019).*

Kohavi, et al., "Trustworthy online controlled experiments: five puzzling outcomes explained", In Proceedings of the 18th ACM SIGKDD International Conference on Knowledge Discovery and Data Mining, Aug. 12, 2012, pp. 786-794.

"Invitation to Pay Additional Fees Issued in PCT Application No. PCT/US22/020469", Mailed Date: Jun. 13, 2022, 10 Pages.

Raff, et al., "The Difference-of-Datasets Framework: A Statistical Method to Discover Insight", In Proceedings of IEEE International Conference on Big Data (Big Data), Dec. 5, 2016, pp. 1824-1831.

"Differential Diagnosis", Retrieved From: http:/web.archive.org/web/20200806102306/https://en.wikipedia.org/wiki/Differential_diagnosis, Aug. 6, 2020, 14 Pages.

"ExP Experimentation Platform—Accelerating Software Innovation through Trustworthy Experimentation", Retrieved From: https://exp-platform.com/, Retrieved From: Feb. 18, 2021, 22 Pages.

"Survivorship Bias", Retrieved From: http://web.archive.org/web/20200706094609/https://en.wikipedia.org/wiki/Survivorship_bias, Jul. 6, 2020, 9 Pages.

Auer, et al., "Current State of Research on Continuous Experimentation: A Systematic Mapping Study", In Proceedings of the 44th Euromicro Conference on Software Engineering and Advanced Applications, Aug. 29, 2018, pp. 335-344.

Bakshy, et al., "Designing and Deploying Online Field Experiments", In Proceedings of the 23rd International Conference on World Wide Web, Apr. 7, 2014, pp. 283-292.

Barik, et al., "The Bones of the System: A Case Study of Logging and Telemetry at Microsoft", In Proceedings of 38th International Conference on Software Engineering Companion, May 14, 2016, pp. 92-101.

Chen, et al., "Automatic Detection and Diagnosis of Biased Online Experiments", In Repository of arXiv: 1808.00114v1, Jul. 31, 2018, 8 Pages.

Deng, et al., "Applying the Delta Method in Metric Analytics: A Practical Guide with Novel Ideas", In Proceedings of the 24th ACM SIGKDD International Conference on Knowledge Discovery and Data Mining, Aug. 19, 2018, pp. 233-242.

Deng, et al., "Trustworthy Analysis of Online A/B Tests: Pitfalls, Challenges and Solutions", In Proceedings of the Tenth ACM International Conference on Web Search and Data Mining, Feb. 6, 2017, pp. 641-649.

Devore, et al., "Modern Mathematical Statistics with Applications", In Publication of Springer, 2012, 854 Pages.

Dmitriev, et al., "A Dirty Dozen: Twelve Common Metric Interpretation Pitfalls in Online Controlled Experiments", In Proceedings of the 23rd ACM SIGKDD International Conference on Knowledge Discovery and Data Mining, Aug. 13, 2017, pp. 1427-1436.

Dmitriev, et al., "Pitfalls of Long-Term Online Controlled Experiments", In Proceedings of the International Conference on Big Data, Dec. 5, 2016, pp. 1367-1376.

Fabijan, et al., "Diagnosing Sample Ratio Mismatch in A/B Testing", Retrieved From: https://www.microsoft.com/en-us/research/group/experimentation-platform-exp/articles/diagnosing-sample-ratio-mismatch-in-a-b-testing/, Sep. 14, 2020, 7 Pages.

Fabijan, et al., "Diagnosing Sample Ratio Mismatch in Online Controlled Experiments: A Taxonomy and Rules of Thumb for Practitioners", In Proceedings of the 25th ACM SIGKDD International Conference on Knowledge Discovery and Data Mining, Aug. 4, 2019, pp. 2156-2164.

Fabijan, et al., "Effective Online Controlled Experiment Analysis at Large Scale", In Proceedings of the 44th Euromicro Conference on Software Engineering and Advanced Applications, Aug. 29, 2018, pp. 64-67.

Zhao, et al., "Online Experimentation Diagnosis and Troubleshooting Beyond AA Validation", In Proceedings of the IEEE International Conference on Data Science and Advanced Analytics, Oct. 17, 2016, pp. 498-507.

Fabijan, et al., "Online Controlled Experimentation at Scale: An Empirical Survey on the Current State of A/B Testing", In Proceedings of the 44th Euromicro Conference on Software Engineering and Advanced Applications, Aug. 29, 2018, pp. 68-72.

Fabijan, et al., "The Benefits of Controlled Experimentation at Scale", In Proceedings of the 43rd Euromicro Conference on Software Engineering and Advanced Applications, Aug. 30, 2017, pp. 18-26.

Gupchup, et al., "Trustworthy Experimentation Under Telemetry Loss", In Proceedings of the 27th ACM International Conference on Information and Knowledge Management, Oct. 22, 2018, pp. 387-396.

Gupta, et al., "The Anatomy of a Large-Scale Experimentation Platform", In Proceedings of the International Conference on Software Architecture, Apr. 30, 2018, 10 Pages.

Kaufman, et al., "Democratizing Online Controlled Experiments at Booking.com", In Repository of arXiv:1710.08217v1, Oct. 23, 2017, 7 Pages.

Kevic, et al., "Characterizing Experimentation in Continuous Deployment: A Case Study on Bing", In Proceedings of the 39th International Conference on Software Engineering: Software Engineering in Practice Track, May 20, 2017, pp. 123-132.

Kluck, et al., "Leaky Abstraction in Online Experimentation Platforms: A Conceptual Framework to Categorize Common Challenges", In Repository of arXiv:1710.00397v1, Oct. 1, 2017, 4 Pages.

Kohavi, et al., "Controlled Experiments on the Web: Survey and Practical Guide", In Journal of the Data Mining and Knowledge Discovery, vol. 18, Issue 1, Jul. 30, 2008, pp. 140-181.

Kohavi, et al., "Online Controlled Experiments and A/B Testing", In Journal of the Encyclopedia of Machine Learning and Data Mining, vol. 7, Issue 8, Jan. 2017, 8 Pages.

Kohavi, et al., "Online Controlled Experiments at Large Scale", In Proceedings of the 19th ACM SIGKDD International Conference on Knowledge Discovery and Data Mining, Aug. 11, 2013, pp. 1168-1176.

Kohavi, Ron, "Pitfalls in Online Controlled Experiments", In Proceedings of the Conference on Digital Experimentation, Oct. 14, 2016, 22 Pages.

Kohavi, et al., "Seven Rules of Thumb for Web Site Experimenters", In Proceedings of the 20th ACM SIGKDD International Conference on Knowledge Discovery and Data Mining, Aug. 24, 2014, pp. 1857-1866.

Kohavi, et al., "The Surprising Power of Online Experiments", In Journal of the Harvard Business Review, vol. 95, Issue 5, Sep. 2017, 8 Pages.

Ku, et al., "From Infrastructure to Culture: A/B Testing Challenges in Large Scale Social Networks", In Proceedings of the 21th ACM SIGKDD International Conference on Knowledge Discovery and Data Mining, Aug. 11, 2015, pp. 2227-2236.

Lindgren, et al., "Software Development as an Experiment System: A Qualitative Survey on the State of the Practice", In Proceedings of the International Conference on Agile Software Development, May 25, 2015, 12 Pages.

Xia, et al., "Safe Velocity: A Practical Guide to Software Deployment at Scale using Controlled Rollout", In Proceedings of the 41st International Conference on Software Engineering: Software Engineering in Practice, May 25, 2019, pp. 11-20.

McKinney, E. H, "Generalized Birthday Problem", In Journal of the American Mathematical Monthly, vol. 73, Issue 4, Apr. 1966, pp. 385-387.

(56) References Cited

OTHER PUBLICATIONS

Pearson, Karl, "On the Criterion that a given System of Deviations from the Probable in the Case of a Correlated System of Variables is such that it can be Reasonably Supposed to have arisen from Random Sampling", In Journal of the London, Edinburgh, and Dublin Philosophical Magazine and Journal of Science, vol. 50, Issue 302, Jul. 1, 1900, pp. 157-175.

Royen, T, "A Simple Proof of the Gaussian Correlation Conjecture Extended to Multivariate Gamma Distributions", In Repository of arXiv:1408.1028, Aug. 5, 2014, 5 Pages.

Runeson, et al., "Guidelines for Conducting and Reporting Case Study Research in Software Engineering", In Journal of the Empirical Software Engineering, vol. 14, Issue 2, Dec. 19, 2008, pp. 131-164.

Sidak, Zbynek, "Rectangular Confidence Regions for the Means of Multivariate Normal Distributions", In Journal of the American Statistical Association, vol. 62, Issue 318, Jun. 1967, pp. 626-633.

Tang, et al., "Overlapping Experiment Infrastructure: More, Better, Faster Experimentation", In Proceedings of the 16th ACM SIGKDD International Conference on Knowledge Discovery and Data Mining, Jul. 25, 2010, pp. 17-26.

Vermeer, Lukas, "Leaky Abstractions in Online Experimentation Platforms", Retrieved From: https://booking.ai/leaky-abstractions-in-online-experimentation-platforms-ae4cf05013f9, Jan. 9, 2019, 7 Pages.

Vermeer, et al., "Sample Ratio Mismatch (SRM) Checker", Retrieved From: https://github.com/lukasvermeer/srm, Aug. 13, 2020, 4 Pages.

Wald, Abraham, "A Method of Estimating Plane Vulnerability Based on Damage of Survivors", In Journal of the Center for Naval Analyses, Jul. 1980, 101 Pages.

Fabijan, et al., "Experimentation Growth: Evolving Trustworthy A/B Testing Capabilities in Online Software Companies", In Journal of the Software: Evolution and Process, vol. 30, Issue 12, Nov. 5, 2018.

Mayring, Philipp, "Qualitative Content Analysis—Research Instrument or Mode of Interpretation", In Journal of the role of the Researcher in Qualitative Psychology, vol. 2, Issue 139-148, 2002.

Kohavi, et al., "Trustworthy Online Controlled Experiments: A Practical Guide to A/B Testing", Published by Cambridge University Press, Apr. 2, 2020, 288 Pages.

"International Search Report and Written Opinion Issued in PCT Application No. PCT/US22/020469", dated Aug. 3, 2022, 16 Pages.

\* cited by examiner

SAMPLE RATIO MISMATCH DIAGNOSIS TOOL

CROSS-REFERENCE TO RELATED APPLICATIONS

N/A

BACKGROUND

An Online Controlled Experiment (OCE), which is often referred to as an A/B test, is becoming a standard operating procedure in data-driven software companies. In its simplest form, an OCE simultaneously presents two variants of a product. One randomly selected group experiences a first version (which may be referred to as a treatment version), and a second randomly selected group experiences a second version (which may be referred to as a control version). In more complex forms, an OCE may include more than one treatment version. One way in which correctly executed OCEs may help improve the quality of a product is in measuring the effect on user behavior of a difference between the first version and the second version. In this way, OCEs help determine a causal effect on user behavior of product modifications (e.g. such as new features).

But like other data analysis methods, OCEs are sensitive to data quality issues. If data quality issues exist in results generated by an OCE, the results may lead to incorrect conclusions. Experimenters must meticulously examine OCEs to rule out any data quality issues that could invalidate the results of their experiments. One of the most useful indicators of a variety of data quality issues is a Sample Ratio Mismatch (SRM). An SRM exists when the observed number of OCE participants in the treatment of an OCE is substantially different from the expected number of participants in the treatment based on how the OCE was configured.

Even when an experimenter is aware of an SRM, the experimenter may have a difficult time identifying a cause of the SRM. One or more of a number of different issues may cause an SRM. Until the experimenter identifies the cause of the SRM, the experimenter may be unable to fix the OCE to address the cause.

SUMMARY

In accordance with one aspect of the present disclosure, a method is disclosed for determining a time period of a root cause of an SRM in an online controlled experiment (OCE). The OCE includes a treatment experience and a control experience. The OCE is configured to compute scorecards according to a pre-defined schedule. Each subsequent scorecard is more expensive to compute. The method includes receiving a first scorecard from the OCE. The first scorecard was computed by the OCE. The OCE includes an expected proportion of users to be assigned to the treatment experience. The first scorecard is for a first period of time, and the first scorecard includes a first proportion of users in the treatment experience. The method further includes determining that the first scorecard does not have the SRM based on a threshold and a first p-value. The first p-value is based on the first proportion of users in the treatment experience and the expected proportion of users to be assigned to the treatment experience. The method further includes receiving a second scorecard from the OCE. The second scorecard is for a second period of time that includes the first period of time and is longer than the first period of time. The second scorecard was computed by the OCE, and the second scorecard includes a second proportion of users in the treatment experience. The method further includes determining that the second scorecard has the SRM based on the threshold and a second p-value. The second p-value is based on the second proportion of users in the treatment experience and the expected proportion of users to be assigned to the treatment experience. The method further includes determining whether the root cause of the SRM in the second scorecard existed in the first scorecard based on the first proportion of users in the treatment experience in the first scorecard and the second proportion of users in the treatment experience in the second scorecard. The method further includes determining whether to stop the OCE from computing an additional scorecard based on determining whether the root cause of the SRM in the second scorecard existed in the first scorecard.

The method may further include determining that the root cause of the SRM in the second scorecard existed in the first scorecard and stopping the OCE from computing the additional scorecard based on determining that the root cause of the SRM in the second scorecard existed in the first scorecard.

Determining that the second scorecard has the SRM may be further based on the second p-value being less than the threshold. The second p-value may be determined using a chi-squared test, a 1-sample proportion test, a binomial test, or a delta method based test.

The threshold may be 0.0005.

Determining whether the root cause of the SRM in the second scorecard existed in the first scorecard may include determining a difference of proportions between the proportion of users assigned to the treatment experience in the first scorecard and the proportion of users assigned to the treatment experience in the second scorecard, determining a confidence interval for the difference of proportions based on a significance level, and determining whether the confidence interval for the difference of proportions contains zero.

The significance level may be 0.01.

Determining whether the root cause of the SRM in the second scorecard existed in the first scorecard may include determining that the root cause of the SRM in the second scorecard existed in the first scorecard when the confidence interval for the difference of proportions contains zero and determining to automatically stop the OCE from computing the additional scorecard when the confidence interval for the difference of proportions contains zero.

Determining whether the root cause of the SRM in the second scorecard existed in the first scorecard may include determining that the root cause of the SRM in the second scorecard exists in new users after the first scorecard when the confidence interval for the difference of proportions does not contain zero and determining to not automatically stop the OCE from computing the additional scorecard when the confidence interval for the difference of proportions does not contain zero.

The method may further include receiving a third scorecard from the OCE. The third scorecard may be for a third period of time that includes the second period of time and is longer than the second period of time and the third scorecard includes a third proportion of users in the treatment experience. The method may further include determining a first interim confidence interval using an observed first interim treatment-to-control (T/C) ratio of the first scorecard. The method may further include determining a second interim confidence interval using an observed second interim T/C ratio. The observed second interim T/C ratio may be based on users in the second scorecard but not in the first scorecard. The method may further include determining a third interim confidence interval for an observed third interim T/C ratio. The observed third interim T/C ratio may be based on users in the third scorecard but not in the second scorecard.

The method may further include determining that the first interim confidence interval includes an expected T/C ratio of the OCE, determining that the second interim confidence interval does not include the expected T/C ratio, determining that the third interim confidence interval does not include the expected T/C ratio, determining that the root cause of the SRM in the second scorecard did not exist in the first scorecard, and determining that the root cause of the SRM in the second scorecard exists in users that are not in the first scorecard but are in the third scorecard.

The method may further include determining that the first interim confidence interval includes the expected T/C ratio, determining that the second interim confidence interval includes the expected T/C ratio, determining that the third interim confidence interval includes the expected T/C ratio, determining that the root cause of the SRM in the second scorecard existed in the first scorecard, and determining to automatically stop the OCE from computing the additional scorecard based on determining that the root cause of the SRM in the second scorecard existed in the first scorecard.

In accordance with another aspect of the present disclosure, a method is disclosed for visually indicating on a display screen of a computing device whether a scorecard has an SRM. The method include receiving a first scorecard from an online controlled experiment (OCE). The OCE includes a treatment experience and a control experience and an expected treatment-to-control (T/C) ratio, and the first scorecard is for a first period of time. The method further includes determining an observed first T/C ratio for the first scorecard and determining a first confidence interval using the observed first T/C ratio based on the expected T/C ratio and a threshold. The method further includes displaying, on a graphical user interface of the display screen, a marker representing the observed first T/C ratio. The method further includes displaying, on the graphical user interface of the display screen, a line representing the first confidence interval. The method further includes displaying, on the graphical user interface of the display screen, a line representing the expected T/C ratio. Whether the line representing the first confidence interval intersects with the line representing the expected T/C ratio indicates whether the first scorecard has an SRM.

The line representing the first confidence interval may not intersect the line representing the expected T/C ratio. The graphical user interface may indicate that the first scorecard has the SRM.

The line representing the first confidence interval may intersect the line representing the expected T/C ratio. The graphical user interface may indicate that the first scorecard does not have the SRM.

The method may further include receiving a second scorecard from the OCE. The second scorecard may be for a second period of time and the second period of time includes the first period of time and is longer than the first period of time. The method may further include determining an observed second T/C ratio for the second scorecard and determining a second confidence interval using the observed second T/C ratio based on the expected T/C ratio and the threshold. The method may further include displaying, on the graphical user interface, a marker representing the observed second T/C ratio and a line representing the second confidence interval. Whether the line representing the second confidence interval intersects with the line representing the expected T/C ratio may indicate whether the second scorecard has the SRM.

The line representing the second confidence interval may not intersect the line representing the expected T/C ratio. The graphical user interface may indicate that the second scorecard has the SRM.

In accordance with another aspect of the present disclosure, a method is disclosed that includes detecting an SRM in two or more online controlled experiments (OCEs) for a product, determining that the two or more OCEs use a same assignment mechanism and data pipeline, determining whether a root cause of the SRM is widespread within recent OCEs for the product, determining a confidence level that the root cause of the SRM is widespread within the recent OCEs for the product, an determining whether to automatically stop the two or more OCEs from running based on whether the root cause of the SRM is widespread and the confidence level. Stopping the two or more OCEs from running results in computation cost savings and savings from assigning additional users to the two or more OCEs.

Determining whether the root cause of the SRM is widespread may further include determining a proportion of scorecards in the recent OCEs that have the SRM.

The method may further include determining that the root cause of the SRM is widespread and determining that the confidence level that the root cause of the SRM is widespread is above a threshold level.

The method may further include automatically stopping the two or more OCEs based on determining that the root cause of the SRM is widespread and determining that the confidence level is above the threshold level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
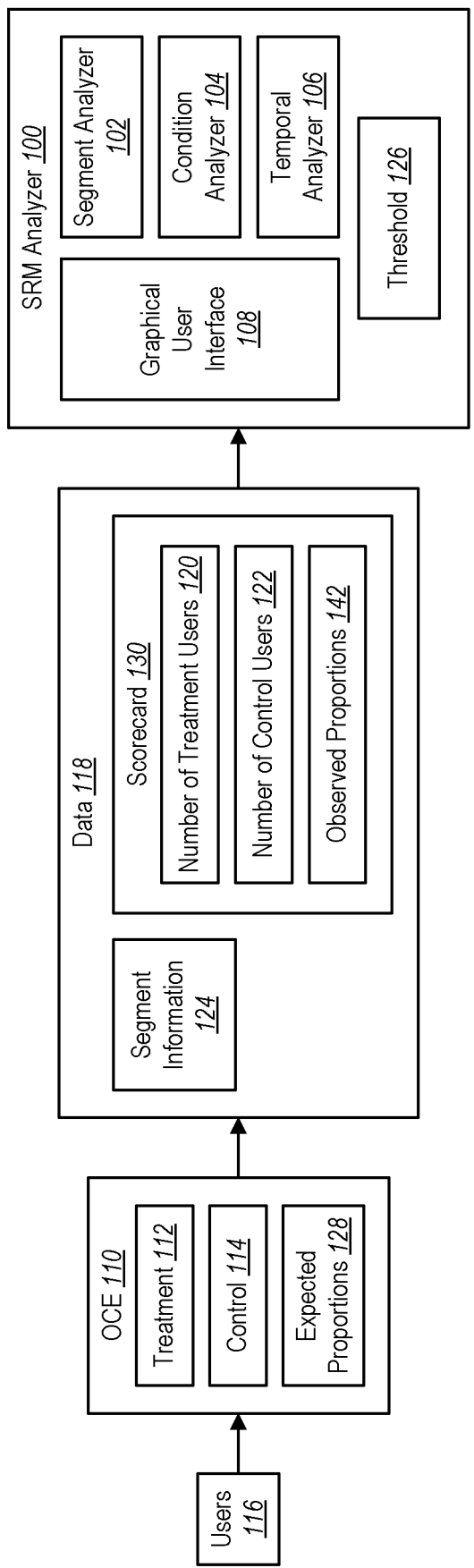
FIG. 1 illustrates an example sample ratio mismatch analyzer for diagnosing a root cause of a sample ratio mismatch in an online controlled experiment.

This disclosure describes systems and methods to help experimenters diagnose a root cause of a sample ratio mismatch that may appear in results generated by an online controlled experiment.

Data-driven software companies use Online Controlled Experiments (OCEs) (which may be referred to as A/B tests) to detect small changes in user behavior resulting from product modifications (e.g. such as new features). An OCE may consist of a randomized experiment with two or more variants. For example, an OCE may consist of a control (variant A) and a treatment (variant B). An OCE typically tests responses to variant A against responses to variant B. The control may represent a current version of a product, and the treatment may represent a version of the product that incorporates a potential change or modification. Among other things, OCEs are useful for understanding user engagement and satisfaction with app or webpage features.

OCEs are sensitive to data quality issues. Data quality issues may invalidate results generated by an OCE. Data quality issues that go unnoticed may lead experimenters to draw incorrect conclusions from the results of an OCE. A useful indicator of a variety of data quality issues is a Sample Ratio Mismatch (SRM). An SRM occurs when the observed sample ratio in the experiment is different from the expected sample ratio. The sample ratio may be a ratio of a number of participants in an OCE who experience the treatment to a number of participants who experience the control. The ratio of treatment participants to control participants may be referred to as a treatment-to-control ratio or a T/C ratio.

SRMs indicate a selection bias in an OCE that invalidates any causal inference that could be drawn from the OCE. If there is a selection bias in a treatment sample or a control sample, then the observed metric movements may be due to the selection bias and cannot be attributed to the treatment effect. While there are many data quality issues that could decrease the validity and significance of an OCE, an SRM in most cases completely invalidates experiment results. An SRM is a symptom for a variety of quality issues. Even though detecting an SRM may be straightforward, correctly identifying the root cause and preventing it from happening in the future is often extremely challenging and time consuming.

An SRM analyzer helps experimenters diagnose the root cause of an SRM. Diagnosing the root cause of an SRM helps experimenters resolve the underlying problem creating data quality issues in their experiments. As a result, experimenters can correct the root cause and fix OCEs to generate meaningful results. Furthermore, because the SRM analyzer provides experimenters information that allows them to debug an OCE, the SRM analyzer may allow experimenters to avoid running costly debugging experiments.

The SRM analyzer may first determine whether an experiment has an SRM. An OCE may be designed to have a certain proportion of participants in the OCE (which may be referred to as users or devices) experience an experiment (treatment) variant of a product and a certain portion experience a control variant of the product. The ratio of the number of participants experiencing the experiment variant to the number of participants experiencing the control variant may be referred to as the treatment-to-control ratio or the T/C ratio. The T/C ratio may be based on an expected proportion of users to be assigned to treatment and an expected proportion of users to be assigned to control. For example, an OCE may be designed to have 50% of OCE participants experience the experiment variant and 50% of OCE participants experience the control variant. In that case, the OCE has an expected T/C ratio of one. Sample Ratio Mismatch (SRM) is a data quality check that indicates a statistically significant difference between expected numbers of users in treatment and control (based on the expected proportions of users to be assigned to treatment and control) on the one hand and a number of users observed in the experiment variant and a number of users observed in the control variant on the other hand. For example, an observed T/C ratio of 50.2/49.8 (821,588 treatment participants versus 815,482 control participants) diverges enough from an expected 50/50 ratio that the probability that it happened by chance is less than 1 in 500 k.

A chi-squared test may be used to measure a probability of whether a count of users assigned to treatment is different from an expected count of users to be assigned to treatment based on how the OCE was configured. The chi-squared test may determine a p-value for the probability. If the p-value is lower than a threshold (such as 0.0005), then the SRM analyzer may determine that an SRM is present in the OCE. The SRM analyzer may cache p-values to optimize performance. The p-value may be provided by an alerting service or extracted from another source. In the alternative, the SRM analyzer may determine the p-value.

When an OCE has an SRM, the SRM analyzer may perform one or more of the following tests to help an experimenter diagnose a root cause of the SRM. First, the SRM analyzer may determine whether the SRM is present in only certain segments of the OCE. Second, the SRM analyzer may determine whether the SRM is present because of a faulty Boolean condition used to create a scorecard for the OCE. Third, the SRM analyzer may determine whether the root cause for the SRM has been present from a beginning of the OCE (which may be performed over multiple days).

A segment analyzer may analyze segments (aka cohorts) of participants in an OCE. Each participant in the OCE may be characterized by one or more attributes or characteristics. For example, a participant in the OCE (whether in the treatment or the control) may use a particular browser (such as Edge) while accessing a product. As another example, a participant may access a product from a particular geographic location. Those attributes may have two or more different values across users. Users who have a same value for a particular attribute may be grouped together as a segment. Thus, each attribute may include two or more segments. For example, the browser attribute may include an Edge segment, a Chrome segment, a Firefox segment, and a Safari segment. A segment may also be defined as users who have a same value for two or more particular attributes. For example, a segment may be all users who used a Safari browser on an iPhone device.

The segment analyzer may analyze each segment (or a subset of segments) included in the OCE and determine whether the segment has an SRM. To give experimenters insight as to whether SRMs are localized or widespread the segment analyzer may provide an intuitive visualization in a graphical user interface. The intuitive visualization may display segments as cells. The intuitive visualization may use colors to communicate information. Cells colored red may have an SRM while cells colored gray or white do not have an SRM. A size of a cell may be proportional to a size of a corresponding segment. Larger cells correspond to larger segments (i.e., segments with a larger number of users) and smaller cells correspond to smaller segments (i.e., segments with a smaller number of users). The intuitive visualization may allow experimenters to filter the intuitive visualization based on the SRM p-value (from small p-value to borderline SRM-p-value to all p-values) and segment size (with respect to all data). The intuitive visualization helps experimenters determine whether an SRM has been detected in only some segments and whether the SRMs (and the segments) are large enough to skew the overall analysis.

It may be the case that a root cause of an SRM is localized to a particular segment. When this is the case, the segments that are impacted may have a low p-value. A low p-value may prompt the OCE owners to analyze that segment more closely to investigate the cause of the SRM. Consider for example a scenario in which one of the variants in an OCE significantly improves web site load time for users that open it by using a particular browser. Faster load times may impact the rate at which telemetry is logged and collected. As a result, this OCE may have an SRM that is localized to that browser type. Other segments, however, may be clean and useful for the analysis.

The SRM analyzer may include a condition analyzer to help an experimenter determine whether a faulty Boolean condition is causing an SRM. One specific type of OCE is a triggered OCE. A triggered OCE may analyze a subset of users assigned to the OCE. Experimenters may create a triggered OCE to increase the sensitivity of metrics generated by the OCE. For example, if a change on a checkout page (such as a new coupon code field) is introduced, it may be valuable to analyze only users that actually visit the checkout page. A triggered OCE may include a Boolean condition that determines the subset of users to analyze.

For triggered OCEs, the condition analyzer may examine the Boolean condition used to decide which logs to keep. In other words, the condition analyzer may determine whether the Boolean condition is causing an SRM in the subset of users being analyzed. An invalid Boolean condition may create an SRM in the subset of users being analyzed. An invalid Boolean condition may occur when a necessary condition for a user to be assigned to the subset of users being analyzed is not present in every variant of the OCE (e.g., it is not present in both treatment and control). Consider if the change in the checkout website example above was a new coupon code field and the condition was zooming-in to users that were exposed to this new field. Unless a counterfactual condition is added to the control variant that does not have this new field, there may be a severe SRM in favor of the treatment. A diagnostic test for identifying a bad condition is to examine whether an untriggered population in an OCE (i.e., all users who participate in the OCE regardless of whether they satisfy the Boolean condition) does not have an SRM. Whenever the untriggered analysis for the OCE has no SRM and a triggered population (i.e., users who satisfy the Boolean condition and are assigned to the subset of users) has an SRM, a misconfigured triggered condition or the lack of logging for the configured condition is the most likely root cause of the SRM.

The SRM analyzer may display a matching analysis in a graphical user interface to illustrate when the SRM may result from a faulty Boolean condition. The matching analysis may use colors to highlight whether a standard analysis (one that includes all users of an OCE) has an SRM and whether a triggered analysis (one that includes only a subset of users that satisfy a Boolean condition) has an SRM. For example, if a standard analysis does not have an SRM, metrics associated with the standard analysis may appear in green. If a triggered analysis has an SRM, metrics associated with the triggered analysis may appear in red.

The SRM analyzer may include a temporal analyzer. The temporal analyzer may examine historical data associated with an OCE to help an experimenter determine whether a root cause of an SRM existed at a beginning of the OCE or arose at a later point in time. The OCE may run for a period of time and produce results on a defined schedule. During a first period of the OCE, the OCE may produce results (which may be referred to as scorecards or analyses) frequently so that an experimenter can promptly detect severe degradations or have confidence in safe velocity of rolling out new features. For example, the OCE may initially produce results after running for a full day, two days, and three days but then not produce additional results until after running for seven days. Each set of results may be cumulative of all users who have participated in the OCE up to that point. The SRM analyzer may not detect an SRM for the first few days of data but then detect an SRM in some or all subsequent data.

There may be two possible explanations for a root cause of an SRM that arises after an OCE has been running for a period of time. The first explanation is that the root cause occurred sometime between a last valid analysis (no SRM detected) and a first invalid analysis (SRM detected). For example, if the temporal analyzer does not detect an SRM in a three-day analysis but does detect an SRM in a five-day analysis (which may be a next analysis after the three-day analysis), a root cause of the SRM may have arisen after day three. A possible root cause of that type of SRM could be a bad code deployment on day four. Such an explanation may be intuitive but is often incorrect. A second—and more commonly correct—explanation for this pattern is a lack of statistical power. The SRM root cause may have been present in the early analysis, but the SRM analyzer did not have enough power (i.e., data) to detect the SRM until the OCE collected sufficient data.

To determine whether a root cause of an SRM was present from a beginning of an OCE or arose between a last valid analysis and a first invalid analysis the temporal analyzer may, for each analysis, compute and/or plot a confidence interval for the unknown ratio of users in treatment to that of control using an observed T/C ratio of the analysis. A confidence interval is a type of estimate computed from the statistics of observed data. A confidence interval gives a range of values for an unknown parameter. A confidence interval may have an associated confidence level that gives a probability with which the computed confidence interval will contain the true value of the parameter. The confidence level is chosen by an experimenter. Factors affecting the width of the confidence interval include the size of the sample, the confidence level, and the variability in the sample. A larger sample will tend to produce a better estimate of the parameter, when all other factors are equal. A higher confidence level will tend to produce a broader confidence interval.

The temporal analyzer may identify a last valid analysis and a first invalid analysis. The last valid analysis may be an analysis that has a confidence interval that includes an expected T/C ratio of the OCE. The last valid analysis may also be an analysis latest in time before the temporal analyzer detected an SRM. In other words, a next analysis in time after the last valid analysis may have an SRM. The first invalid analysis may be defined as an analysis that has a confidence interval that does not include the expected T/C ratio of the OCE. The first invalid analysis may also be an analysis earliest in time that has an SRM.

The temporal analyzer may use a statistical test (such as a difference of proportions test) to determine whether an observed T/C ratio of the first invalid analysis statistically differs from an observed T/C ratio of the last valid analysis. When the answer is no (i.e., when the statistical test determines that the first invalid analysis does not differ statistically from the last valid analysis), the temporal analyzer may determine that a root cause of the SRM has been present in the OCE all along. In this case, the reason the SRM did not appear earlier may be because the SRM analyzer did not have enough power to detect the SRM until after receiving more data. When the answer is yes, the temporal analyzer may determine that the root cause of the SRM arose in new users of the first invalid analysis.

The temporal analyzer may reliably tell experimenters whether to look for root causes that were present from the beginning of the OCE as opposed to wondering what went wrong between the last valid analysis and the first invalid analysis.

In addition to helping with diagnostics, the SRM analyzer may enable significant computation savings for calculating OCE statistics because the SRM analyzer may be designed to automatically stop OCE computation of a scorecard study once the SRM analyzer detects that the root cause for the SRM has been present from a beginning of the OCE. An OCE may be designed to generate scorecards (which may contain metrics associated with the OCE) according to a pre-defined schedule. For example, the OCE may generate scorecards after one day, two days, three days, five days, seven days, fourteen days, twenty-one days, and twenty-eight days. Each subsequent scorecard may be cumulative of previous scorecards. In other words, each scorecard may include data for all users through the day when the scorecard is generated. As a result, each subsequent scorecard may be more expensive to compute because it contains data for a longer period.

In situations in which the SRM analyzer detects an SRM and the temporal analyzer is confident that the SRM does not result from a transient problem between two dates (e.g. between the third day scorecard and the fifth day scorecard) but rather from an issue present from a beginning of the OCE, the SRM analyzer may automatically stop the OCE from generating additional scorecards and save the computational costs for even more expensive scorecards. For example, assume an OCE will generate scorecards on a first day, a second day, a third day, a fifth day, a seventh day, a fourteenth day, a twenty-first day, and a twenty-eighth day of the OCE. Assume further that the SRM analyzer determines on the third day that a root cause of an SRM in the OCE was present from a beginning of the OCE. Automatically stopping the OCE and not computing the seventh and fourteenth day scorecards may result in savings of thousands of PN hours and hundreds of dollars. Indeed, it may be that computation costs roughly double as a duration of a scorecard doubles in time duration. A large company may run thousands of OCEs a month. If even a small percentage of those OCEs have an SRM, the computational cost savings from automatically stopping OCEs with data quality issues can be substantial. And as described above, OCEs will have more than just seventh-day and fourteenth-day scorecards. In fact, the twenty-first-day and twenty-eighth-day scorecards will be even larger and costlier. Testing has shown that stopping a twenty-eight-day OCE after just the third day could save at least 89% of processing compared to processing the entire OCE. The SRM analyzer may be able to automatically stop OCEs because it knows that any results generated will not be useful to the customer for decision. Stopping the OCE may further save costs associated with assigning additional users to an OCE with data-quality issues.

Furthermore, when an SRM is detected in one OCE for a product, other OCEs for the product may also have an SRM. If multiple OCEs using a same assignment mechanism and data pipeline suddenly experience an SRM, the reason for the SRM may be widespread and not specific to the OCE itself. For example, issues in a data pipeline that is common to multiple OCEs may cause SRMs in the multiple OCEs. In this scenario, the cost of wasteful computation is multiplied. The SRM analyzer may take all recent OCEs for a product into account to determine if the root cause is widespread (e.g. by analyzing the proportion of scorecards with an SRM). If the root cause is widespread and the SRM analyzer has high confidence in this conclusion, the SRM analyzer may utilize an auto-shutdown feature and automatically stop the multiple OCEs from running for the given product. The SRM analyzer may determine that it has a high confidence in this conclusion when the SRM analyzer determines that a confidence level of this conclusion exceeds a threshold level. Stopping the multiple OCEs from running for the given product may result in computational cost savings and saving costs associated with assigning additional users to OCEs with data-quality issues.

FIG. 1 illustrates an example SRM analyzer 100. The SRM analyzer 100 receives data 118 from an OCE 110.

The OCE 110 is an online controlled experiment (which may be referred to as an A/B experiment, A/B test, or an experiment). The OCE 110 may attempt to compare user experience with two or more variations of a product (such as a webpage or application) or a product feature. One of the variations may be a control experience. The control variation may represent a current version of the product or feature. One of the variations may be a treatment experience. The treatment experience may represent a potential change to the product. For example, the control variation may represent a current version of a website that has a menu of options on a left side of the webpage, and the treatment variation may include the same content as the current version of the website but may place the menu of options on a top portion of the webpage.

Participants in the OCE 110 may be randomly assigned to the control experience or the treatment experience. For example, the OCE 110 may include a treatment 112 (which may be a treatment experience) and a control 114 (which may be a control experience). Users 116 may be participants in the OCE 110. The users 116 may be randomly assigned to the treatment 112 or the control 114. Although the OCE 110 assigns the users 116 to one of only two groups, in other OCEs, intended participants may be assigned to one of three or more groups (such as a control, a first treatment, and a second treatment).

The OCE 110 may produce data 118 as the users 116 participate in the OCE 110. The data 118 may include information allowing an experimenter to compare user experiences in the treatment 112 with user experiences in the control 114. For example, the OCE 110 may be designed to test whether a change to a webpage results in users spending more time interacting with the webpage. In that case, the data 118 may include information indicating a length of time that each participant spent interacting with the webpage. An experimenter may compare the lengths of time that participants in the control 114 spent interacting with the webpage with the lengths of time that participants in the treatment 112 spent interacting with the webpage. The experimenter may use that information in evaluating whether to implement changes to the webpage. Click rates is another type of data that the OCE 110 may collect.

In using the data 118 to decide whether to make changes to a product, experimenters must be aware of potential data quality issues. If the data 118 has data quality issues, experimenters may draw incorrect conclusions from the data 118. One type of data quality issue is a sample ratio mismatch (SRM). The OCE 110 may be designed to have a certain ratio of the users 116 experience the treatment 112 as compared to the control 114. This certain ratio may be an expected T/C ratio. For example, the OCE 110 may be designed such that the expected T/C ratio is one. In that case, the OCE 110 may be designed to have an equal number of the users 116 experience the treatment 112 as experience the control 114. The OCE 110 may include expected proportions 128. The expected proportions 128 may include an expected proportion of users in treatment and an expected proportion of users in control. The expected proportion of users in treatment may be a percentage of the users 116 that the OCE 110 is configured to assign to the treatment 112. The expected proportion of users in control may be a percentage of the users 116 that the OCE 110 is configured to assign to the control 114. For example, the expected proportion of users in treatment may be 50%, and the expected proportion of users in control may be 50%. In that case, the OCE 110 may be configured to assign 50% of the users 116 to the treatment 112 and 50% of the users 116 to the control 114. In that case, the expected T/C ratio of the OCE 110 may be one.

After or while conducting the OCE 110, the data 118 may show that the OCE 110 has an SRM. An SRM may exist in the data 118 when a difference between an observed proportion of users in the treatment 112 is different from the expected proportion of users in treatment in a statistically significant way. The SRM analyzer 100 may analyze the data 118 to determine whether the data 118 has an SRM.

The data 118 may include a scorecard 130. The scorecard 130 may include information (such as metrics) about the OCE 110 for a certain period of time (which may be less than a full period of time during which the OCE has or will run). The scorecard 130 may include information about users who participated in the OCE 110 during the certain period of time. For example, the scorecard 130 may include a number of treatment users 120 and a number of control users 122. The number of treatment users 120 may represent a number of the users 116 who experienced the treatment 112 during the certain period of time. The number of control users 122 may represent a number of the users 116 who experienced the control 114 during the certain period of time.

The SRM analyzer 100 may determine an observed T/C ratio using the number of treatment users 120 and the number of control users 122. The SRM analyzer 100 may determine the observed T/C ratio by dividing the number of treatment users 120 by the number of control users 122.

The SRM analyzer 100 may determine observed proportions using the number of treatment users 120 and the number of control users 122. The observed proportions may include an observed proportion of users in the treatment 112. The observed proportions may include an observed proportion of users in the control 114. The SRM analyzer 100 may determine the observed proportion of users in the treatment 112 by dividing the number of treatment users 120 by the sum of the number of treatment users 120 and the number of control users 122. The SRM analyzer 100 may determine the observed proportion of users in the control 114 by dividing the number of control users 122 by the sum of the number of treatment users 120 and the number of control users 122. Alternatively, the scorecard 130 may include observed proportions 142.

The SRM analyzer 100 may determine a difference between the observed proportions 142 and the expected proportions 128. The SRM analyzer 100 may determine a difference between the observed proportion of users in the treatment 112 and the expected proportion of users in treatment. The SRM analyzer 100 may determine a difference between the observed proportion of users in the control 114 and the expected proportion of users in control. The SRM analyzer 100 may determine a difference between the number of treatment users 120 and an expected number of treatment users. The expected number of treatment users may be based on a total number of users and the expected proportion of users in treatment. For example, the expected number of treatment users may be determined by multiplying the expected proportion of users in treatment and a sum of the number of treatment users 120 and the number of control users 122. The SRM analyzer 100 may determine a difference between the number of control users 122 and an expected number of control users. The expected number of control users may be based on the total number of users and the expected proportion of users in control. The SRM analyzer 100 may use a statistical test to determine a p-value for any of the foregoing differences. For example, the SRM analyzer 100 may use a statistical test to determine a p-value for any difference between the number of treatment users 120 and the expected number of treatment users or any difference between the observed proportion of users in the treatment and the expected proportion of users in treatment. For example, the SRM analyzer 100 may use a chi-squared test to determine the p-value. The SRM analyzer 100 may also use a 1-sample proportion test, or a binomial test. In the alternative, the SRM analyzer 100 may receive the p-value, which may have been computed using a chi-squared test or another statistical test. The SRM analyzer 100 may compare the p-value to a threshold 126. The SRM analyzer 100 may determine that the data 118 has an SRM if the p-value (which the SRM analyzer 100 may have computed or received) is less than the threshold 126. The SRM analyzer 100 may use other tests, such as a binomial, a 1-sample proportion test, or a delta method based test, to determine whether an SRM exists. As another example, the SRM analyzer 100 may determine a confidence interval using the difference between an observed T/C ratio and an expected T/C ratio. The observed T/C ratio may be determined by dividing the number of treatment users 120 by the number of control users 122. If the confidence interval contains zero, the SRM analyzer 100 may determine that an SRM does not exist. If the confidence interval does not contain zero, the SRM analyzer 100 may determine that an SRM does exist. The SRM analyzer 100 may communicate the existence of an SRM in the data 118 to an experimenter. For example, the SRM analyzer 100 may communicate the existence of the SRM to the experimenter using a graphical user interface 108. The graphical user interface 108 may be visible to the experimenter on a display screen of a computing device. The graphical user interface 108 may employ the temporal analyzer 106, which may indicate SRMs during certain timeframes by using a statistical test based upon the observed T/C ratio. If this ratio differs from the expected T/C ratio, the graphical user interface 108 and/or the temporal analyzer 106 may indicate an SRM. This hypothesis test is asymptotically equivalent to the chi-squared test, but may differ in some rare cases.

Once an experimenter realizes that the data 118 includes an SRM, the experimenter may try to identify a root cause of the SRM. Knowing the root cause of the SRM may allow the experimenter to modify the OCE 110 in order to eliminate the SRM and obtain new data that does not suffer from data quality issues. There may, however, be many potential root causes of an SRM. As a result, it may be difficult for the experimenter to determine the root cause of an SRM.

The SRM analyzer 100 assists experimenters in determining root causes of SRMs. The SRM analyzer 100 may include a segment analyzer 102, a condition analyzer 104, and a temporal analyzer 106. The segment analyzer 102 may determine whether an SRM of an OCE is localized to one or more segments or is widespread across segments. The condition analyzer 104 may determine whether the SRM was caused by an invalid Boolean condition used for triggering. The temporal analyzer 106 may determine whether a root cause of the SRM was present from a beginning of the OCE.

The segment analyzer 102 may perform analysis to help an experimenter determine whether an SRM in the data 118 is isolated to one or more segments of the data 118. The data 118 may include segment information 124. The segment information 124 may identify two or more segments included in the data 118. The segment information 124 may indicate a size of each of the two or more segments. The size of a segment may be a total number of users (both treatment and control) who are included in the segment. The segment information 124 may indicate a number of control users and a number of treatment users in each of the two or more segments. References to users and participants may be considered references to devices as well.

Each user who participates in the OCE 110 may have one or more characteristics. For example, a user may access the OCE 110 from a certain geographic region (such as the United States), during a certain period of the day (such as the morning), using a particular device (such as an iPhone), and using a particular browser (such as Chrome). A segment may be a group of users who participated in the OCE 110 that share a common characteristic. For example, all users who accessed the OCE 110 using an iPhone may be a segment. That segment may have a size, such as 10,000 users. As another example, all users who accessed the OCE 110 using a Safari browser may be a segment. That segment may have a size of 600 users. All users who participate in the OCE 110 may be considered a segment.

Some segments of the data 118 may have an SRM while others may not. Consider segments for a country from which a user accessed the OCE 110. Some countries may have slow connectivity. If the treatment introduces a change to a webpage that takes longer to load for some countries, segments for those countries may have an SRM (because many users assigned to the treatment may not be counted in the experiment due to connectivity issues) while other countries do not. Consider another example in which the data 118 includes segments for browsers. Assume that some browsers display the treatment better than other browsers. If a user opens a particular product on a device with a first type of browser that does not display the treatment, the user may not be able to complete the experiment and data will not be collected. As a result, a segment of users with the first type of browser may have an SRM while segments of users for other types of browsers do not.

The segment analyzer 102 may determine, for each segment (or a subset of segments), whether the segment has an SRM. For each segment, the segment analyzer 102 may determine (or receive) an observed number of segment users in treatment and an observed number of segment users in control. The number of segment users in treatment may be a number of users in that segment that were in the treatment 112, and the observed number of segment users in control may be a number of users in that segment that were in the control 114. For each segment, the segment analyzer 102 may determine (or receive) an expected number of segment users in treatment and an expected number of segment users in control based on the expected proportions 128 and a total number of users in the segment. For example, assume the expected proportion of users in treatment is 50% and a segment has a total number of users in the segment of 100. The segment analyzer 102 may determine (or receive) an expected number of segment users in treatment of 50 (100*50%).

For each segment, the segment analyzer 102 may perform a statistical test, such as a chi-squared test, on the difference between the observed number of segment users in treatment and the expected number of segment users in treatment (or a difference between the observed proportion of segment users in treatment and the expected proportion of users in treatment) to determine a segment p-value. Determining the segment p-value may also be based on the observed number of segment users in control and the expected number of segment users in control. In the alternative to determining a segment p-value, the segment analyzer 102 may receive a segment p-value for each segment. For each segment, the segment analyzer 102 may determine whether the segment p-value (which may be computed or received) is less than the threshold 126. The segment analyzer 102 may communicate results to an experimenter, such as through the graphical user interface 108.

The SRM analyzer 100 may display information on the graphical user interface 108 based on what the segment analyzer 102 determines for each segment. The graphical user interface 108 may display each segment (or a subset of the segments) as a bar or other shape. The graphical user interface 108 may group together segments that fall within a particular characteristic. For example, the graphical user interface 108 may group together segments for browser type. The graphical user interface 108 may display segments that have an SRM in a first color (such as red) and segments that do not have an SRM in a second color (such as green or white). The graphical user interface 108 may display segments proportional to their size such that larger segments have a greater area than smaller segments.

The graphical user interface 108 may indicate a direction of an SRM in a segment. For example, assume the expected T/C ratio is one. Assume that in a first segment, a first observed segment T/C ratio (which may be a ratio of a number of segment users in treatment to a number of segment users in control) is greater than one (and the p-value is less than the threshold 126) and that in a second segment, a second observed segment T/C ratio is less than one (and the p-value is less than the threshold 126). The graphical user interface 108 may communicate to an experimenter that the first segment has an SRM going a first direction and that the second segment has an SRM going a second direction. For example, the graphical user interface 108 may place an asterisk next to the bar representing the second segment to indicate that the second segment has more control users than treatment users.

The segment analyzer 102 may sort segments shown in the graphical user interface 108 based on segment size and segment p-value. Doing so may display the segments in a prioritized order. In other words, the graphical user interface 108 may display the segments in an order in which an experimenter should investigate the segments for a root cause of the SRM of the OCE 110. For example, examining a large segment (i.e., a segment with a large number of users) that has a low segment p-value may be more likely to provide insight into a root cause of an SRM than investigating a small segment that has a relatively high segment p-value. Similarly, examining a small segment that has an SRM may be more interesting in pointing an experimenter to a root cause of an SRM than examining a large segment that does not have an SRM.

Knowing the one or more segments that include an SRM, the size of the one or more segments that include an SRM, the severity of the SRM in the one or more segments, and the direction of the SRM in the one or more segments may help the experimenter more efficiently identify the root cause of an SRM of the OCE 110.

The condition analyzer 104 may determine whether a condition used to create a scorecard for the OCE 110 is faulty.

When the users 116 interact with the OCE 110, the OCE 110 may collect events associated with those interactions. For example, the OCE 110 may collect click rates for a particular link contained in the OCE 110. The OCE 110 may transform the events into metrics and include the metrics in a scorecard (such as the scorecard 130). A standard scorecard may include data the OCE 110 collects for both the treatment 112 and the control 114.

In some OCEs, not all users who participate in an OCE are necessarily exposed to an aspect of a product or webpage that is being tested. For example, assume that an OCE is testing changes to a checkout page of a webpage but that not all users who begin interacting with the OCE reach the checkout page.

For OCEs of this type, an OCE may generate a triggered scorecard. In this situation, the data 118 may include a triggered scorecard, and the SRM analyzer 100 may use the triggered scorecard to determine whether the OCE has an SRM. The triggered scorecard may include metrics for only users who were or could have been exposed to an aspect of a product or webpage that is being tested. A Boolean condition is used to determine whether a user is included in the triggered scorecard. The triggered scorecard may allow an experimenter to focus on (zoom-in on) users of greatest interest. But an experimenter may define the Boolean condition in such a way that more users (and in some instances only users) in the treatment 112 actually reach the aspect of the product or webpage that is being tested or such that more users (and in some instances only users) in the treatment 112 are added to the triggered scorecard. Alternatively, the Boolean condition may be defined in such a way that it is less likely that users in the control 114 satisfy the Boolean condition. The reverse may also be true (i.e., the Boolean condition may be defined such that more users in the control 114 are added to the triggered scorecard). When a faulty Boolean condition exists, the number of treatment users 120 may be larger (or smaller) than expected as compared to the number of control users 122.

The condition analyzer 104 may determine whether a standard scorecard (which includes all users of the OCE 110) included in the data 118 has an SRM and whether a triggered scorecard (which includes only users that satisfy a Boolean condition) in the data 118 has an SRM. The condition analyzer 104 may cause the graphical user interface 108 to indicate when the standard scorecard does not include an SRM but the triggered scorecard does include an SRM. When the condition analyzer 104 determines that the triggered scorecard includes an SRM but the standard scorecard does not, the condition analyzer 104 may indicate to an experimenter that the Boolean condition is disproportionately qualifying users for treatment or control.

The temporal analyzer 106 may help an experimenter determine whether a root cause of an SRM of the OCE 110 existed from the beginning of the OCE 110 or arose at some point during the OCE 110.

The OCE 110 may receive participants over a defined period of time. For example, the OCE 110 may take place over a four-week time period. During the period of time, the OCE 110 may periodically produce scorecards. The OCE 110 may produce scorecards based on a defined schedule. For example, the OCE 110 may produce a scorecard after each day of the OCE 110. Alternatively, assume the OCE 110 runs for two weeks. The OCE 110 may produce a first scorecard after a first day of the OCE 110, a second scorecard after a second day of the OCE 110, a third scorecard after a fifth day of the OCE 110, a fourth scorecard after a seventh day of the OCE 110, and a fifth scorecard after a fourteenth day of the OCE 110. Each scorecard is cumulative of previous scorecards. In other words, each scorecard may include all users who have participated in the OCE 110 up to that point. For example, returning to the example with five scorecards, the first scorecard may be based on all users to participate in the OCE 110 on the first day, and the second scorecard may be based on all users to participate in the OCE 110 on the first day and the second day.

The SRM analyzer 100 may determine, for each scorecard, whether the OCE 110 includes an SRM. Returning again to the five scorecard example, the SRM analyzer 100 may receive the first scorecard after the first day and determine whether the first scorecard has an SRM. The SRM analyzer 100 may receive the second scorecard after the second day and determine whether the second scorecard has an SRM. The SRM analyzer 100 may repeat this process for each scorecard the OCE 110 produces over the course of the OCE 110. The SRM analyzer 100 may use p-values or confidence intervals to determine whether a scorecard has an SRM.

It may be that the SRM analyzer 100 determines that one or more scorecards produced by the OCE 110 during a first period of the OCE 110 do not have SRMs but that one or more scorecards produced by the OCE 110 during a second period after the first period do have SRMs. The temporal analyzer 106 may analyze the scorecards to help an experimenter determine whether the SRM identified after the first period has a root cause that existed from a beginning of the OCE 110 or arose at some later point. For example, it may be that the SRM existed from the beginning of the OCE 110 but did not appear in a scorecard during the first period because the one or more scorecards produced by the OCE 110 during the first period did not include sufficient data to identify the SRM.

The temporal analyzer 106 may perform one or more analyses to determine whether an SRM existed from a beginning of the OCE 110.

One analysis that the temporal analyzer 106 may perform is a cumulative scorecard data analysis. The temporal analyzer 106 may, for each scorecard, determine a scorecard confidence interval using an observed scorecard T/C ratio of the scorecard. The temporal analyzer 106 may determine whether the scorecard confidence interval of each scorecard includes the expected T/C ratio.

The temporal analyzer 106 may identify a last valid scorecard and a first invalid scorecard using the scorecard confidence intervals. For example, consider the five scorecard example above. Assume the first scorecard, the second scorecard, and the third scorecard all have scorecard confidence intervals that include the expected T/C ratio. Assume the fourth scorecard and the fifth scorecard have scorecard confidence intervals that do not include the expected T/C ratio. The third scorecard may be the last valid scorecard and the fourth scorecard may be the first invalid scorecard.

The temporal analyzer 106 may perform a difference in proportions test on the first invalid scorecard and the last valid scorecard to determine whether a difference between a proportion of users assigned to treatment in the last valid scorecard and a proportion of users assigned to treatment in the first invalid scorecard is statistically meaningful. Continuing with the example above, the temporal analyzer 106 may perform a difference in proportions test on the third scorecard and the fourth scorecard. If the difference in proportions between the third scorecard and the fourth scorecard is statistically meaningful, the temporal analyzer 106 may determine that an SRM arose after the third scorecard. If the difference in proportions between the third scorecard and the fourth scorecard is not statistically meaningful, the temporal analyzer 106 may determine that an SRM existed from a beginning of the OCE 110.

To visually communicate the analysis described above the temporal analyzer 106 may generate a cumulative data plot for display on the graphical user interface 108. The cumulative data plot may show a scorecard confidence interval using an observed scorecard T/C ratio of each scorecard using cumulative data (i.e., data for all users who participated in the OCE 110 up through the time the OCE 110 generated the scorecard).

As an additional analysis, the temporal analyzer 106 may generate an interim data plot for display on the graphical user interface 108. The interim data plot shows, for each scorecard, an interim confidence interval using an observed interim T/C ratio of users new to the OCE 110 since the previous scorecard. The temporal analyzer 106 may identify any scorecards with an interim confidence interval that does not include the expected T/C ratio 128. The temporal analyzer 106 may determine that an SRM exists in any interim users associated with those scorecards. If all the interim confidence intervals include the expected T/C ratio, then the temporal analyzer 106 may determine that a root cause of the SRM existed from a beginning of the OCE 110.

Figure 2:
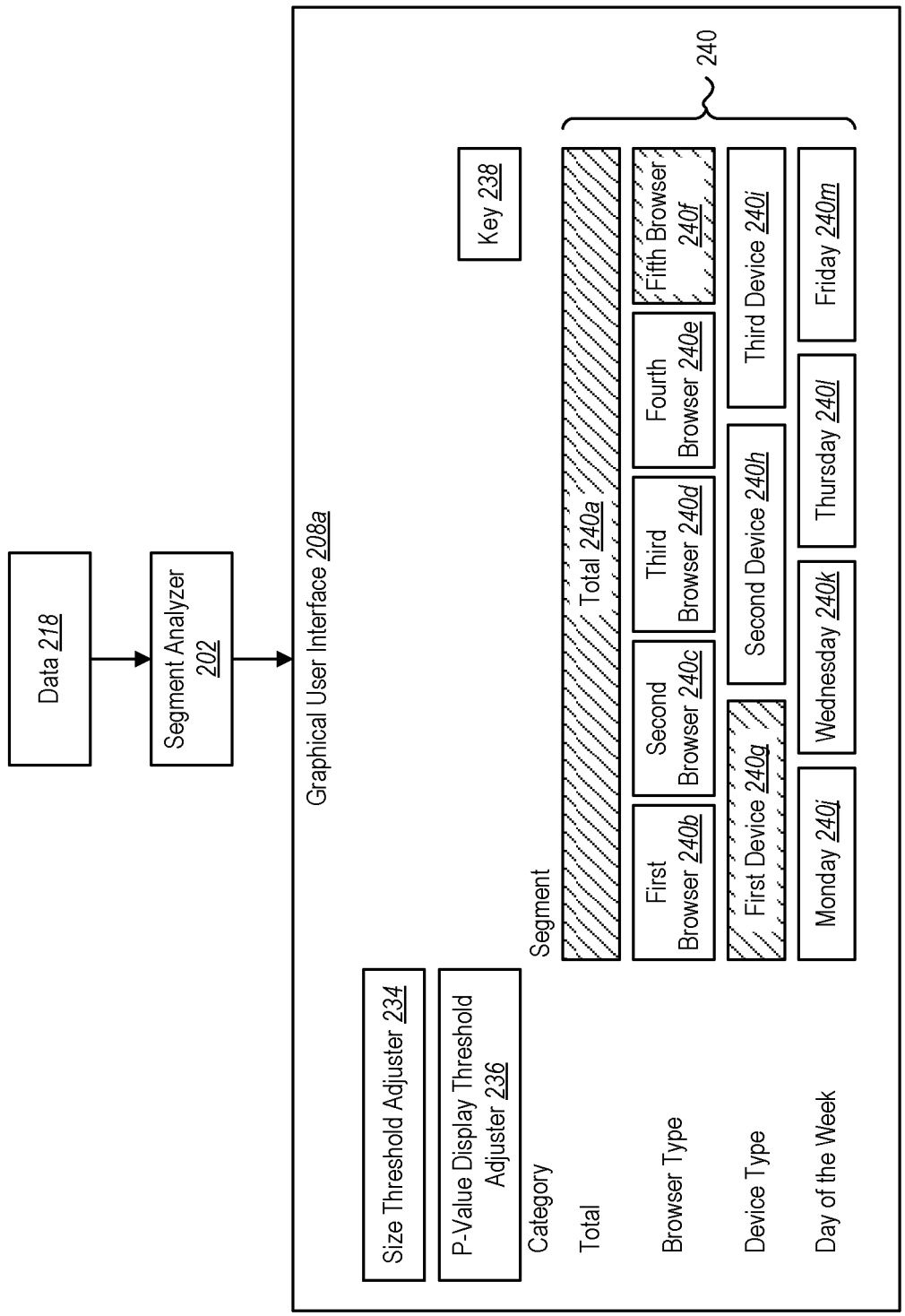
FIG. 2 illustrates an example segment analyzer and graphical user interface for identifying segments of an online controlled experiment that may contain a root cause of a sample ratio mismatch.

FIG. 2 illustrates a segment analyzer 202 that receives data 218.

An OCE may generate the data 218. The data 218 may result from users participating in the OCE. The OCE may include a treatment and a control. The data 218 may indicate a number of users in a treatment of the OCE and a number of users in a control of the OCE. The users who participate in the OCE may have one or more characteristics. For example, the users may use a particular browser, a particular device type, and participate in the OCE on a particular day of the week. Each characteristic may have one or more values. For example, a browser characteristic may have a value of Chrome, Firefox, Edge, or Safari. All users who share a same value for a specific characteristic may belong to a segment. For example, all users who used an Edge browser to access the OCE may belong to an Edge segment. The OCE may include hundreds of segments. A product that is the subject of an OCE may define the possible segments. In other words, the product may determine what characteristics of users the product (and thus the OCE) tracks and reports. The examples of segments described herein are merely examples. OCEs may include some or none of these example segments. OCEs may also include segments not expressly described herein.

Each segment may include a number of segment users in treatment and a number of segment users in control. The number of segment users in treatment may be a number of users in the segment who participated in the treatment of the OCE. The number of segment users in control may be a number of users in the segment who participated in the control of the OCE.

The segment analyzer 202 may compute or receive a segment p-value for each segment in the data. The segment p-value may be computed using a chi-squared test (or another statistical test) based on the difference between the number of segment users in treatment and an expected number of segment users in treatment. The expected number of segment users in treatment may be based on a total number of users in a segment and an expected proportion of users in treatment for the OCE. For example, if a segment has 100 total users and an OCE has an expected proportion of users in treatment of 50%, an expected number of segment users in treatment may be 50 (100*50%).

The segment analyzer 202 may determine whether the segment p-value of each segment is less than a threshold. The threshold may be identical to a threshold used to determine whether the OCE as a whole has an SRM. The segment analyzer 202 may determine that any segment with a segment p-value less than the threshold has an SRM.

The segment analyzer 202 may communicate information regarding the segments of the OCE in a graphical user interface 208a. The graphical user interface 208a may include one or more elements that represent one or more segments in the data 218. The graphical user interface 208a may represent one or more segments in the data 218 using cells 240. Each of the cells 240 may represent a segment of the data 218. The graphical user interface 208a may not include elements for all segments in the data 218. In other words, the OCE may include segments not displayed in the graphical user interface 208a. The following are example segments that a product may define that may be represented by the cells 240. In other examples, an OCE may include different segments.

Cell 240a may represent a segment of all users in the OCE.

Cell 240b may represent users in the OCE who used a first type of browser (such as Edge) to access the OCE. Cell 240c may represent users in the OCE who used a second type of browser (such as Firefox) to access the OCE. Cell 240d may represent users in the OCE who used a third type of browser (such as Chrome) to access the OCE. Cell 240e may represent users in the OCE who used a fourth type of browser (such as Safari) to access the OCE. Cell 240f may represent users in the OCE who used a fifth type of browser (such as Kindle) to access the OCE. Segments represented by cells 240a-f may all belong to a browser type characteristic. There may be additional browser types used by participants in the OCE that are not shown in the graphical user interface 208a.

Cell 240g may represent users in the OCE who used a first type of device (such as an iPhone) to participate in the OCE. Cell 240h may represent users in the OCE who used a second type of device (such as an Android device) to participate in the OCE. Cell 240i may represent users in the OCE who used a third type of device (such as a Windows device) to participate in the OCE. Segments represented by cells 240g-i may all belong to a device type characteristic. There may be additional device types used by participants in the OCE that are not shown in the graphical user interface 208a.

Cell 240j may represent users in the OCE who used accessed the OCE on Monday. Cell 240k may represent users in the OCE who used accessed the OCE on Wednesday. Cell 240l may represent users in the OCE who used accessed the OCE on Thursday. Cell 240m may represent users in the OCE who used accessed the OCE on Friday. Segments represented by cells 240j-m may all belong to a day of the week characteristic. Participants in the OCE may have accessed the OCE on other days of the week not shown in the graphical user interface 208a.

A size of the cells 240 may be proportional to a relative size of the segments that the cells 240 represent. Thus, if a first cell is larger than a second cell, then a first segment represented by the first cell has more users than a second segment represented by the second cell. For example, the cell 240b is larger than the cell 240c. Therefore, the number of users who used the first browser type to access the OCE is greater than the number of users who used the second browser type to access the OCE.

The segment analyzer 202 may cause the graphical user interface 208a to display cells that represent segments with an SRM in a particular color different from a color of cells that represent segments that do not have an SRM. For example, in the graphical user interface 208a, the cells 240a, 240g, 240f are shaded to represent that the cells 240a, 240g, 240f may have a color different from other cells. The color may indicate that the segments represented by the cells 240a, 240g, 240f have an SRM.

The graphical user interface 208a may include a size threshold adjuster 234 and a p-value display threshold adjuster 236. The size threshold adjuster 234 may allow an experimenter to adjust a minimum size of a segment (in terms of total number of users) required for a cell representing the segment to appear on the graphical user interface 208a. For example, assume the minimum size is set to 1,000 users. Assume 800 users belong to a segment of users who used a fourth type of device. Because the segment includes a number of users less than the minimum size, a cell representing the segment may not appear on the graphical user interface 208a.

The p-value display threshold adjuster 236 may allow an experimenter to adjust a maximum p-value of a segment for a cell representing the segment to appear on the graphical user interface 208a. For example, assume the maximum p-value is set to 0.05. Assume a segment has a p-value of 0.07. Because the segment has a p-value greater than the maximum p-value, a cell representing the segment may not appear on the graphical user interface 208a.

The graphical user interface 208a may include a key 238. The key 238 may communicate a meaning of colors or symbols used in the graphical user interface 208a. For example, the key 238 may state that a specific color indicates that a segment has an SRM. The key 238 may also state that a specific symbol (such as an asterisk) indicates that a segment has an SRM in a certain direction.

The segment analyzer 202 may slice the data 218 into at least two levels: a primary segment value (e.g. Market/US) and a secondary segment value (e.g. Browser/Chrome). Using both a primary segment value and a secondary segment value may allow experimenters to see the effect of their changes for users in one secondary segment value of one primary segment value. For example, experimenters could see whether an SRM exists for US Market participants who used a Chrome browser. Oftentimes, the SRM root cause is localized to segments that are special in some way, e.g. a bug in the code causing users on a kindle device to experience a data loss. The segment analyzer 202 may first find all tuples (a primary characteristic, a primary segment, a secondary characteristic) that has at least one secondary segment with an SRM and at least one secondary segment with no SRM. Next, the segment analyzer 202 may rank the ratio of SRM sample size at the secondary characteristic level in ascending order. Finally, for each secondary characteristic, all the segments may be ordered by how much the observed segment T/C ratio differs from an expected T/C ratio (descending), segment sample size ratio (descending), and SRM p-value (ascending). Doing so produces an ordered list of likely segments for an SRM root cause. With this information, the OCE may automatically compute a new scorecard that excludes the problematic segments (e.g. segments with observed T/C ratio>threshold). This would save computational resources as scorecards with less data (fewer segments) will compute with fewer resources.

Figure 3:
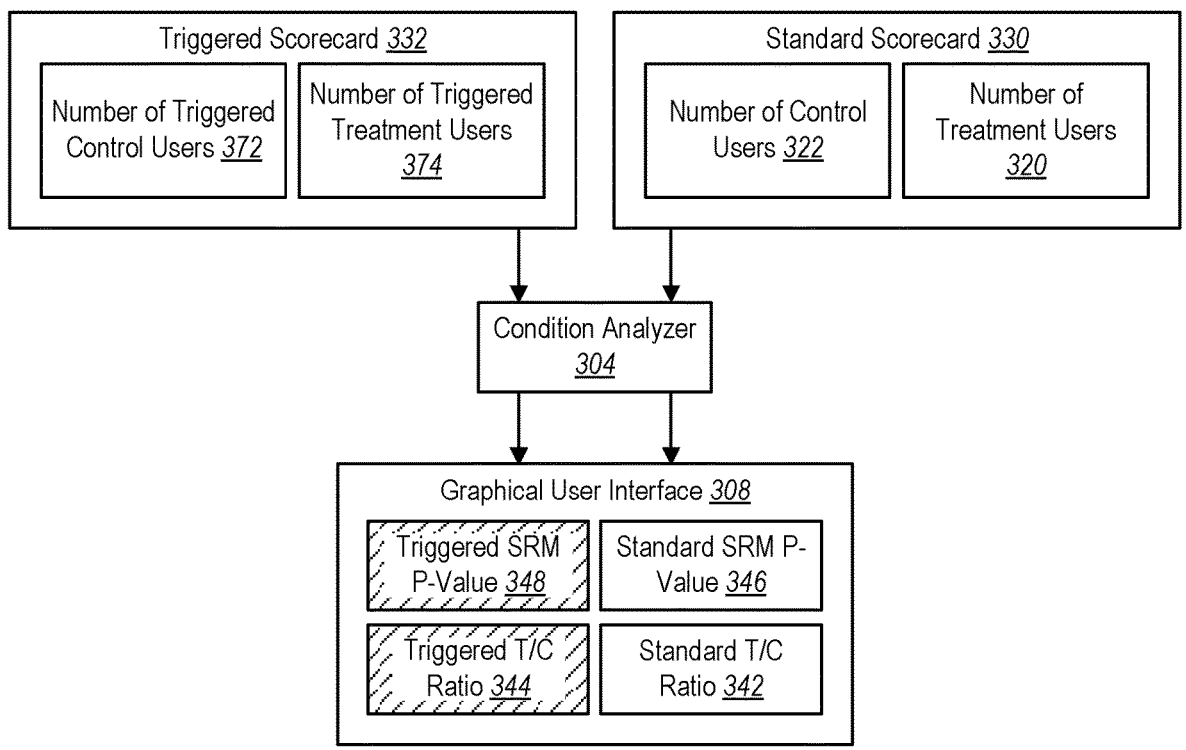
FIG. 3 illustrates an example condition analyzer and graphical user interface for determining whether a faulty Boolean condition is a root cause of a sample ratio mismatch.

FIG. 3 illustrates an example condition analyzer 304. The condition analyzer 304 may receive a standard scorecard 330 and a triggered scorecard 332. The standard scorecard 330 may include all users who participated in an OCE. The triggered scorecard 332 may include only users who satisfy a specified Boolean condition.

The condition analyzer 304 may determine or receive an observed standard T/C ratio 342 for the standard scorecard 330. The observed standard T/C ratio 342 may be a ratio of a number of users who participated in a treatment of the OCE (a number of treatment users 320) to a number of users who participated in a control of the OCE (a number of control users 322).

The condition analyzer 304 may determine or receive an observed triggered T/C ratio 344 for the observed triggered scorecard 332. The observed triggered T/C ratio 344 may be a ratio of a number of users who participated in a treatment of the OCE and satisfy the Boolean condition (a number of triggered treatment users 374) to a number of users who participated in a control of the OCE and satisfy the Boolean condition (a number of triggered control users 372).

The condition analyzer 304 may determine or receive a difference between the number of treatment users 320 and an expected number of treatment users (determined based on a total number of users in the standard scorecard 330 and an expected T/C ratio of the OCE or an expected proportion of users in treatment of the OCE). The condition analyzer 304 may determine or receive a standard SRM p-value 346 for the standard scorecard 330 based on the difference. The condition analyzer 304 may determine whether the standard SRM p-value 346 is less than a threshold.

The condition analyzer 304 may determine or receive a difference between the number of triggered treatment users 374 and an expected number of triggered treatment users (determined based on a total number of users in the triggered scorecard 332 and the expected T/C ratio of the OCE or an expected number of users in treatment of the OCE). The condition analyzer 304 may determine or receive a triggered SRM p-value 348 for the triggered scorecard 332 based on the difference. The condition analyzer 304 may determine whether the triggered SRM p-value 348 is less than the threshold. The condition analyzer 304 may use a same threshold in analyzing both the standard scorecard 330 and the triggered scorecard 332.

The condition analyzer 304 may cause the standard SRM p-value 346, the observed standard T/C ratio 342, the observed triggered T/C ratio 344, and the triggered SRM p-value 348 to appear on a graphical user interface 308. If the triggered SRM p-value 348 is less than the threshold, the condition analyzer 304 may cause the graphical user interface 308 to display the triggered SRM p-value 348 and the observed triggered T/C ratio 344 in a specific color (such as red).

Figure 4A:
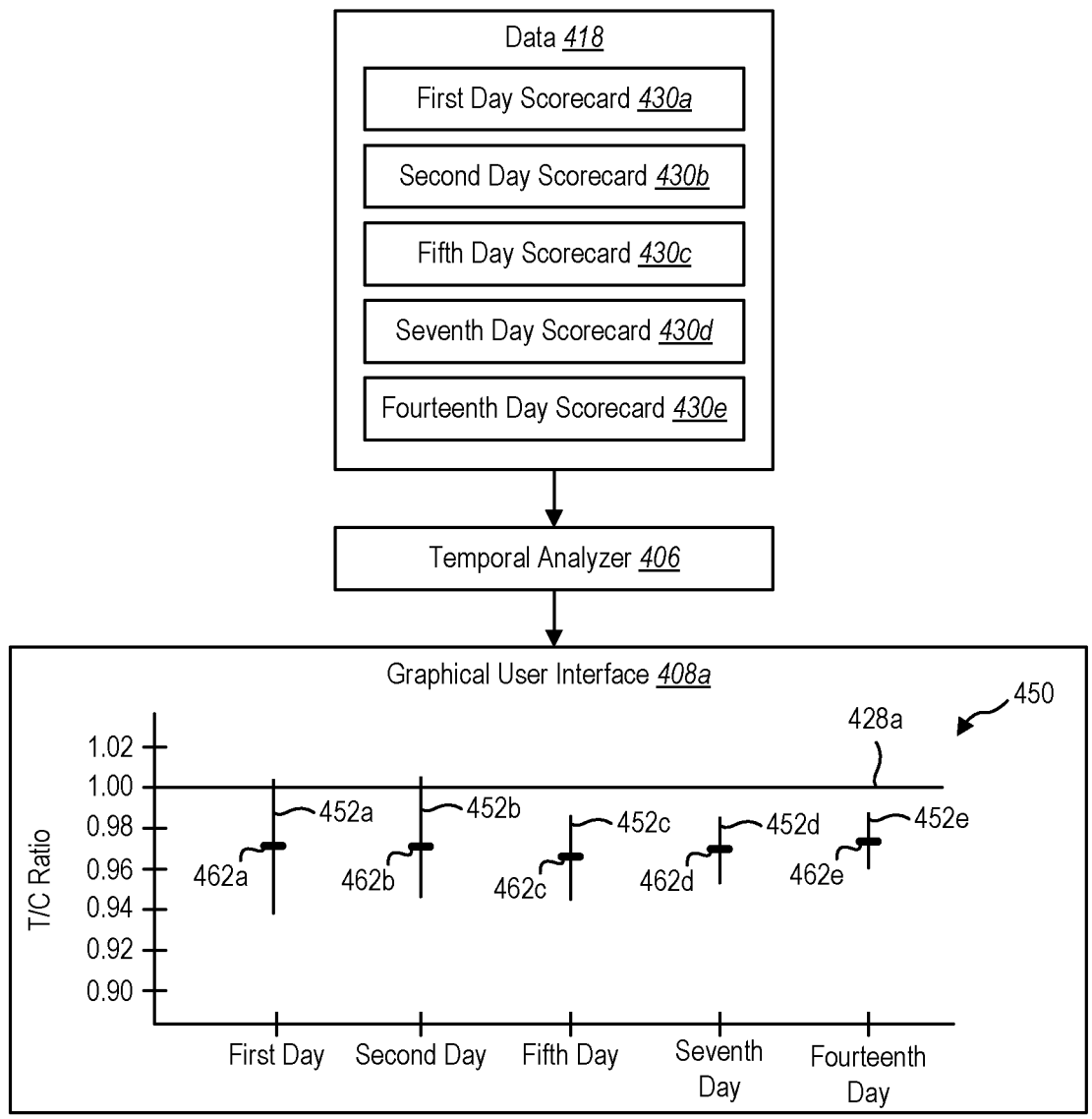
FIG. 4A illustrates an example temporal analyzer and graphical user interface for determining whether a root cause of a sample ratio mismatch existed from a beginning of an online controlled experiment.

FIG. 4A illustrates an example temporal analyzer 406. The temporal analyzer 406 may receive data 418 and generate graphical user interface 408a. The temporal analyzer 406 may have any of the features or characteristics of, or perform any of the functions performed by, the temporal analyzer 106.

An OCE may generate the data 418. The OCE may be scheduled to run for a defined period of time. For example, the OCE may be scheduled to run for fourteen days. During the time that the OCE is running, the OCE may receive users to participate in the OCE. The users may be randomly assigned to either a treatment experience or a control experience. The OCE may be configured to assign a certain proportion of users to the treatment experience and a certain proportion to the control experience. For example, the OCE may be designed to assign fifty percent of the users to the treatment and fifty percent of the users to the control. In that case, the OCE may have an expected T/C ratio of one.

During the defined period of time, the OCE may generate scorecards. The scorecards may include information regarding the OCE, users who participated in the OCE, and user interactions with the OCE. For example, a scorecard may specify a scorecard time period, a number of users who participated in the treatment during the scorecard time period, and a number of users who participated in the control during the scorecard time period. The OCE may generate scorecards at certain points during the defined period of time. For example, assume the OCE is designed to run for fourteen days. The OCE may generate a scorecard after a first day (a first day scorecard 430a), a second day (a second day scorecard 430b), a fifth day (a fifth day scorecard 430c), a seventh day (a seventh day scorecard 430d), and a fourteenth day (a fourteenth day scorecard 430e). A scorecard may include information for the OCE from a start of the OCE through a day on which the OCE produces the scorecard. For example, the fifth day scorecard 430c may include a cumulative number of users who participated in the OCE from a beginning of the OCE through the fifth day of the OCE.

For each scorecard, the temporal analyzer 406 may determine or receive an observed scorecard T/C ratio. The observed scorecard T/C ratio may be a ratio of a number of users in treatment in the scorecard to a number of users in control in the scorecard.

For each scorecard, the temporal analyzer 406 may determine or receive a difference between a number of users in treatment in the scorecard and a number of expected users in treatment for the scorecard (or a difference between a proportion of users in treatment in the scorecard and an expected proportion of users in treatment for the OCE). For each scorecard, the temporal analyzer 406 may determine or receive a scorecard p-value for the difference. The scorecard p-value may be further based on a number of users in control in the scorecard and a number of expected users in control for the scorecard.

The temporal analyzer 406 may determine, for each scorecard, whether the scorecard has an SRM. The scorecard may have an SRM if the scorecard p-value is less than a threshold. The threshold may be identical to a threshold used to determine whether the OCE as a whole has an SRM. In a situation in which the OCE generates scorecards over a period of time, some scorecards may not have an SRM while other scorecards may have an SRM. For example, consider the example in which the OCE runs for a period of fourteen days and generates scorecards after the first day (the first day scorecard 430a), the second day (the second day scorecard 430b), the fifth day (the fifth day scorecard 430c), the seventh day (the seventh day scorecard 430d), and the fourteenth day (the fourteenth day scorecard 430e). The temporal analyzer 406 may determine that neither the first day scorecard 430a and the second day scorecard 430b has an SRM but that each of the fifth day scorecard 430c, the seventh day scorecard 430d, and the fourteenth day scorecard 430e has an SRM.

As an alternative to or in addition to using p-values to identify scorecards that have an SRM, the temporal analyzer 406 may use confidence intervals to identify scorecards that have an SRM and to visually communicate whether a scorecard has an SRM to experimenters through the graphical user interface 408a. The temporal analyzer 406 may generate a plot 450 and cause the graphical user interface 408a to display the plot 450. For each scorecard received from the OCE, the temporal analyzer 406 may generate a point on the plot 450 indicating an observed scorecard T/C ratio of the scorecard. For example, the plot 450 may include point 462a showing an observed scorecard T/C ratio for the first day scorecard 430a, point 462b showing an observed scorecard T/C ratio for the second day scorecard 430b, point 462c showing an observed scorecard T/C ratio for the fifth day scorecard 430c, point 462d showing an observed scorecard T/C ratio for the seventh day scorecard 430d, and point 462e showing an observed scorecard T/C ratio for the fourteenth day scorecard 430e.

For each scorecard received from the OCE, the temporal analyzer 406 may cause the graphical user interface 408a to show on the plot 450 a scorecard confidence interval using the observed scorecard T/C ratio. For example, the plot 450 may include scorecard confidence interval 452a for the first day scorecard 430a, scorecard confidence interval 452b for the second day scorecard 430b, scorecard confidence interval 452c for the fifth day scorecard 430c, scorecard confidence interval 452d for the seventh day scorecard 430d, and scorecard confidence interval 452e for the fourteenth day scorecard 430e.

The plot 450 may also include a line 428a indicating the expected T/C ratio of the OCE. A scorecard associated with a scorecard confidence interval that does not intersect the line 428a may have an SRM. For example, in the plot 450, the fifth day scorecard 430c, the seventh day scorecard 430d, and the fourteenth day scorecard 430e may each have an SRM because the confidence intervals 452c, 452d, 452e do not intersect the line 428a. The plot 450 may display confidence intervals that do not intersect the line 428a in a color different from confidence intervals that do intersect the line 428a in order to further visually indicate scorecards that have an SRM. For example, the plot 450 may display the confidence intervals 452c, 452d, 452e in a first color different from a second color used to display the confidence intervals 452a, 452b.

As illustrated by the plot 450, the temporal analyzer 406 may identify an SRM only after the OCE has run for several days. The reason may be a lack of power (i.e., a lack of sufficient data). At the beginning of the OCE, the temporal analyzer 406 may lack sufficient data to declare an SRM even though the observed T/C ratio may be closer to the expected T/C ratio later in the OCE (for example, the point 462e is closer to the line 428a than the point 462b). The scorecard confidence intervals 462a-e show that error in the observed T/C ratio lessens as a number of users in a scorecard increases.

When the temporal analyzer 406 identifies an SRM in a scorecard (such as the fifth day scorecard 430c), the temporal analyzer 406 may test for a difference in proportions to determine whether the SRM existed from a beginning of the OCE. The temporal analyzer 406 may have identified an SRM in a scorecard using p-values, confidence intervals, or both. Testing for a difference in proportions may involve the temporal analyzer 406 testing a difference between a proportion of users assigned to treatment on a last scorecard that did not include an SRM (in this case, the second day scorecard 430b) and a proportion of users assigned to treatment in a first scorecard that did include an SRM (in this example, the fifth day scorecard 430c). If the temporal analyzer 406 does not determine a statistically meaningful difference in proportions, the temporal analyzer 406 may determine that the SRM results from a power issue. When an SRM results from a power issue, the temporal analyzer 406 may determine that the SRM existed from a beginning of the OCE.

The temporal analyzer 406 may cause scorecard confidence intervals that do not intersect with the line 428a to appear in a specific color in the graphical user interface 408a that is different from scorecard confidence intervals that do intersect with the line 428a.

Figure 4B:
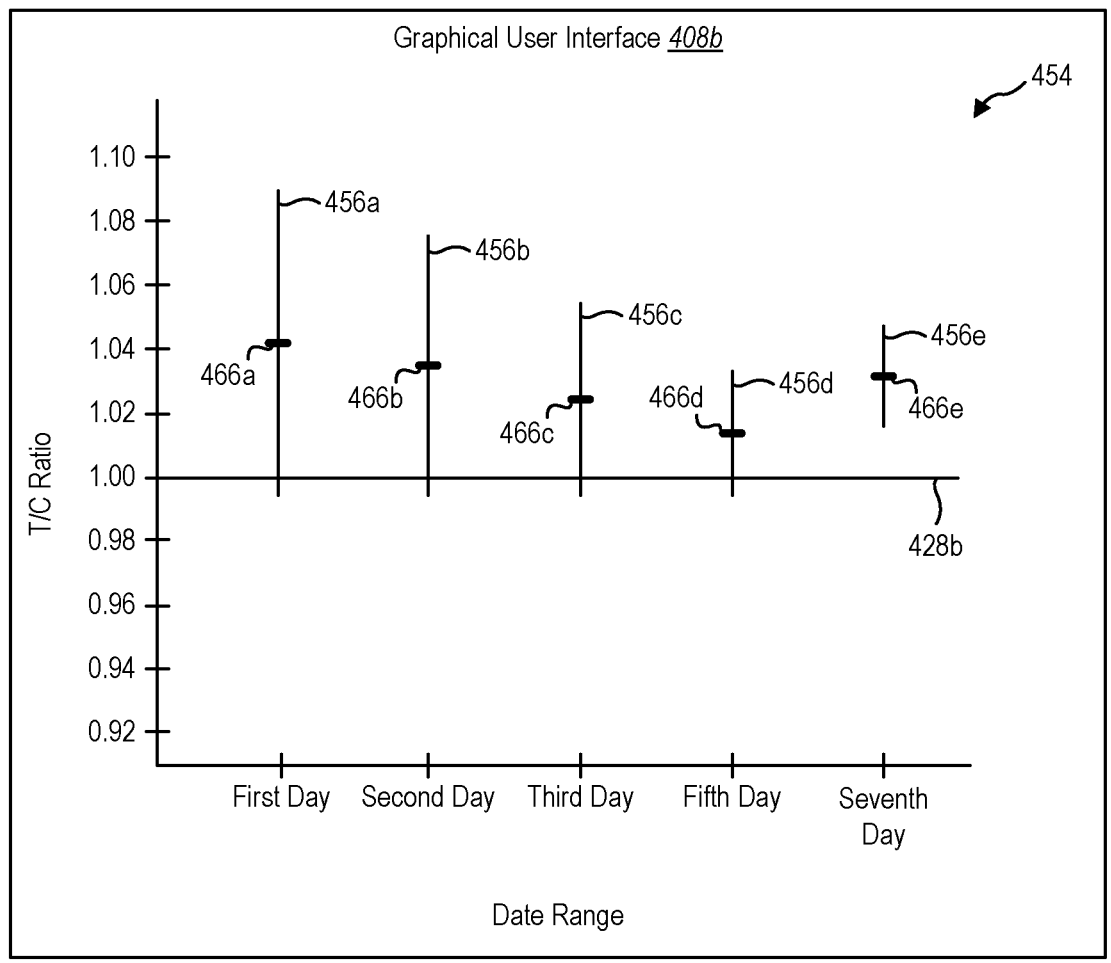
FIG. 4B illustrates an example graphical user interface for illustrating cumulative scorecards associated with an online controlled experiment.
Figure 4C:
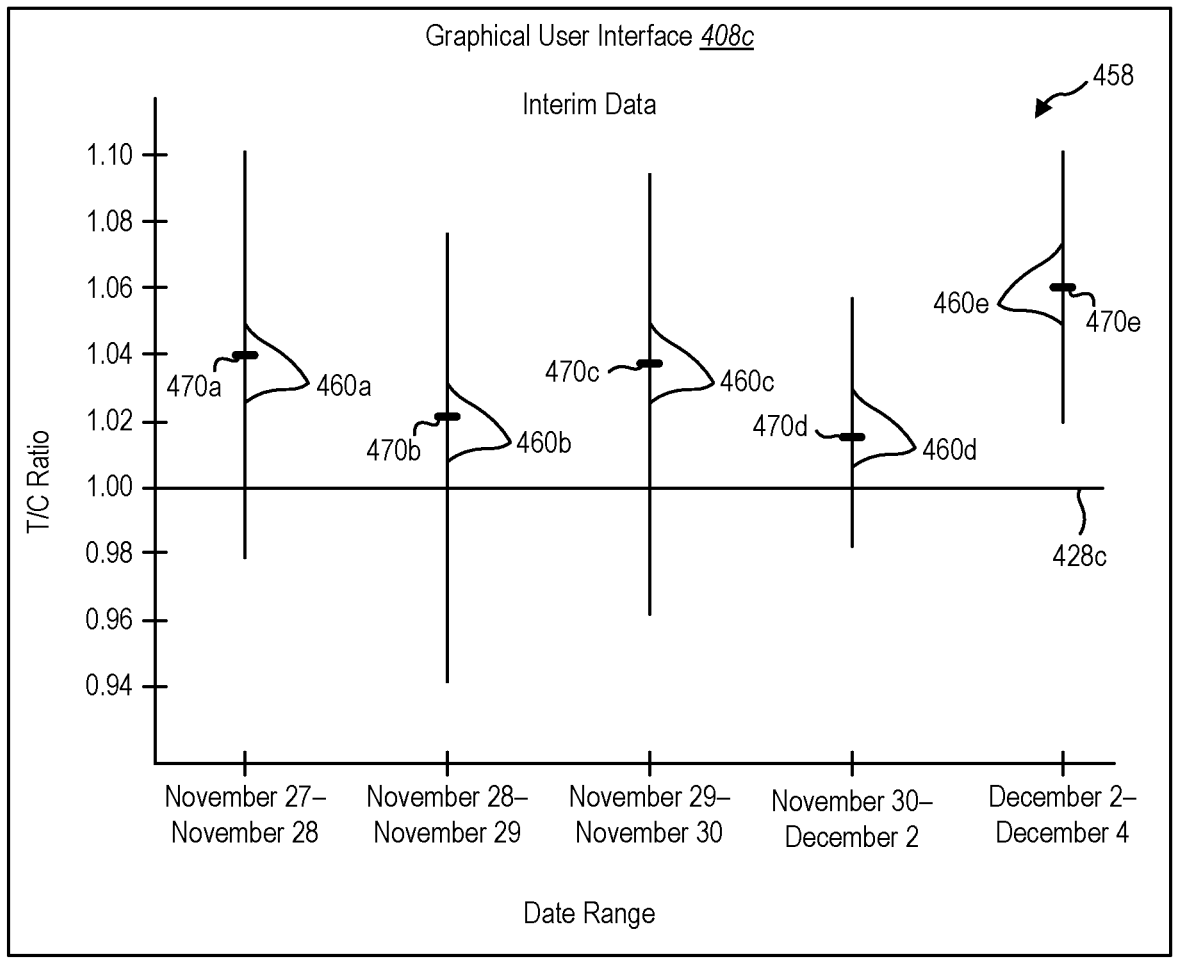
FIG. 4C illustrates an example graphical user interface for illustrating interim scorecards associated with an online controlled experiment.

FIGS. 4B and 4C illustrate a situation in which an SRM that arises during an OCE is not a result of a power issue.

A temporal analyzer (such as the temporal analyzer 106 or the temporal analyzer 406) may first detect an SRM a few days after an OCE begins due to some unusual behavior on certain dates. The temporal analyzer may determine if any particular dates are problematic and indicate if a root cause may be found on those dates.

Consider the cumulative data table below for an OCE. The p-values in the data table may be calculated using a delta-method-based test based on an observed number of users in treatment, an observed number of users in control, an expected number of users in treatment, and an expected number of users in control. The expected number of users in control may be based on an expected proportion of users to be assigned to control in the OCE. The expected number of users in treatment may be based on an expected proportion of users to be assigned to treatment in the OCE. The expected T/C ratio in this example is one. The delta method is a result concerning the approximate probability distribution for a function of an asymptotically normal statistical estimator from knowledge of the limiting variance of that estimator.

| Scorecard Length | Start Date | End Date | # Treatment | # Control | P-Value | CI Lower | CI Upper | Observed T/C |
|---|---|---|---|---|---|---|---|---|
| 1 d | 2019 Nov. 27 | 2019 Nov. 28 | 9,328 | 8,968 | 0.008 | 0.989 | 1.092 | 1.040 |
| 2 d | 2019 Nov. 27 | 2019 Nov. 29 | 16,459 | 15,996 | 0.010 | 0.990 | 1.068 | 1.029 |
| 3 d | 2019 Nov. 27 | 2019 Nov. 30 | 25,159 | 24,463 | 0.002 | 0.997 | 1.060 | 1.028 |
| 5 d | 2019 Nov. 27 | 2019 Dec. 2 | 40,976 | 40,148 | 0.005 | 0.996 | 1.045 | 1.021 |
| 7 d | 2019 Nov. 27 | 2019 Dec. 4 | 61,747 | 59,734 | 7.67e-9 | 1.014 | 1.054 | 1.034 |

Each row in the data table may be associated with a scorecard. A first row (below the header row) of the data table may be associated with a first day scorecard, a second row of the data table may be associated with a second day scorecard, a third row of the data table may be associated with a third day scorecard, a fourth row of the data table may be associated with a fifth day scorecard, and a fifth row of the data table may be associated with a seventh day scorecard. Each scorecard may include all users who participated in the OCE between the start date and end date associated with the scorecard. Each scorecard may include all users from all preceding scorecards.

For each scorecard, the temporal analyzer may use the p-values, the confidence intervals, or both in determining whether a scorecard has an SRM. For example, the temporal analyzer may determine whether a scorecard has an SRM based on whether a p-value of the scorecard is less than a threshold. The threshold may be 0.0005. The threshold may be adjusted using Šidák's correction to adjust for multiple comparisons. As another example, the temporal analyzer may determine whether a scorecard has an SRM based on whether a confidence interval of the scorecard includes the expected T/C ratio. The temporal analyzer may determine that the seventh day scorecard has an SRM because a confidence interval of the seventh day scorecard does not include the expected T/C ratio of one.

The temporal analyzer may illustrate some information associated with each row on a graphical user interface 408b. The graphical user interface 408b may include a plot 454. The plot 454 may include a line 428b indicating an expected T/C ratio of the OCE. In the plot 454, the expected T/C ratio is one.

The plot 454 may include a point for each observed T/C ratio in the data table. For example, the plot 454 may include point 466a for the observed T/C ratio of the first day scorecard, point 466b for the observed T/C ratio of the second day scorecard, point 466c for the observed T/C ratio of the third day scorecard, point 466d for the observed T/C ratio of the fifth day scorecard, and point 466e for the observed T/C ratio of the seventh day scorecard.

The plot 454 may include a graphical illustration of a confidence interval using the observed T/C ratio of each scorecard. For example, the plot 454 may include confidence interval 456a using the observed T/C ratio of the first day scorecard, confidence interval 456b using the observed T/C ratio of the second day scorecard, confidence interval 456c using the observed T/C ratio of the third day scorecard, confidence interval 456d using the observed T/C ratio of the fifth day scorecard, and confidence interval 456e using the observed T/C ratio of the seventh day scorecard.

The plot 454 may illustrate visually when a scorecard has an SRM. When a confidence interval does not intersect the line 428b, the temporal analyzer may determine that a scorecard associated with the confidence interval has an SRM. For example, in the plot 454, the confidence interval 456e does not intersect the line 428b. As a result, an experimenter may conclude that the seventh day scorecard has an SRM.

The temporal analyzer may determine a confidence interval for a scorecard using the following equation. In the alternative, the temporal analyzer may receive the confidence interval, which may have been determined using the following equation.

$$\frac{x}{n-x} \pm z_{1-\alpha/2}\sqrt{\frac{p}{n(1-p)^3}}$$

x is a number of users observed in treatment in the scorecard.

n is a total number of users in the scorecard.

x/(n−x) is the observed T/C ratio for the scorecard.

p is the proportion of users expected in treatment. In this example, the expected T/C ratio is one. As a result, in this example, p is ½.

$z_{1-\alpha/2}$ is the (1−α/2)-quantile of the normal distribution.

α is the threshold used to determine whether the OCE has an SRM. In this example, α=0.0005. α may also be referred to as a significance level and may be adjusted using Šidák's correction in certain scenarios. In statistics, the Šidák correction, or Dunn-Šidák correction, is a method used to counteract the problem of multiple comparisons. It is a simple method to control the familywise error rate. When all null hypotheses are true, the method provides familywise error control that is exact for tests that are stochastically independent, is conservative for tests that are positively dependent, and is liberal for tests that are negatively dependent. It is credited to a 1967 paper by the statistician and probabilist Zbyněk Šidák.

When a temporal analyzer determines that a scorecard has an SRM, the temporal analyzer tests for a difference in proportions between a proportion of users assigned to treatment on a last scorecard without an SRM (which is the fifth day scorecard) and a proportion of users assigned to treatment in a first scorecard with an SRM (the seventh day scorecard). If the temporal analyzer does not identify a meaningful difference in proportions, the temporal analyzer categorizes the SRM as a power issue and determines that a root cause of the SRM existed from a beginning of the OCE.

The temporal analyzer may test for a difference of proportions as follows. Assume a last valid scorecard without an SRM had x users assigned to treatment and n total users, and a first invalid scorecard that has an SRM has an additional y users assigned to treatment and an additional m total users. A confidence interval for the difference in the proportion assigned to treatment is:

$$\left(\frac{y}{m} - \frac{x}{n}\right) \pm z_{1-\alpha'/2}\sqrt{\hat{p}(1-\hat{p})\left(\frac{1}{m} + \frac{1}{n}\right)}$$

$\hat{p}=(x+y)/(n+m)$ is the proportion of users assigned to treatment in the latest scorecard.

$z_{1-\alpha'/2}$ is the (1−α'/2)-quantile of the normal distributions.

α' is a significance level for declaring a meaningful difference in proportions. α' may have a value of 0.01.

If the above confidence interval does not contain 0, the temporal analyzer may declare a meaningful difference in proportions. When a meaningful difference in proportions exists, the temporal analyzer may determine that a root cause of the SRM arose in new users in the first invalid scorecard. In that case, an experimenter may focus on new users (users in the first invalid scorecard that are not in the last valid scorecard) when searching for the root cause of the SRM.

As shown in the plot 454, the seventh day scorecard has an SRM, but none of the previous scorecards have an SRM. An experimenter may wonder whether the SRM is due to a power issue (i.e., the temporal analyzer did not have enough users in the scorecard to detect it before the seventh day scorecard) or whether a proportion of users assigned to treatment meaningfully changed in the seventh day scorecard. In the latter case, an experimenter may narrow the experimenter's search for the root cause of the SRM to events transpiring after the fifth day scorecard.

For purposes of this example, assume there were the following number of new users assigned to treatment and control in the seventh day scorecard:

| Start Date | End Date | # Treatment | # Control |
| --- | --- | --- | --- |
| 2019 Dec. 2 | 2019 Dec. 4 | 20,771 | 19,586 |

The temporal analyzer may construct a (1−α') confidence interval for the difference in proportions. For purposes of this example, α'=0.01.

In this example, zero is not contained in the confidence interval. Thus, the temporal analyzer may determine that the proportion of users assigned to treatment differed for the new users in the seventh day scorecard as compared to the proportion of users assigned to treatment in the fifth day scorecard. As a result, an experimenter may narrow a search for an underlying cause of the SRM to these new users.

The temporal analyzer may also use interim data to determine whether a root cause of an SRM exists in new users. Consider an example interim data table as follows, which is based on the example data used in reference to FIG. 4B:

| Start Date | End Date | # Treatment | # Control | CI Lower | CI Upper | Observed T/C |
|---|---|---|---|---|---|---|
| 2019 Nov. 27 | 2019 Nov. 28 | 9,328 | 8,968 | 0.983 | 1.098 | 1.040 |
| 2019 Nov. 28 | 2019 Nov. 29 | 7,131 | 7,028 | 0.949 | 1.080 | 1.015 |
| 2019 Nov. 29 | 2019 Nov. 30 | 8,700 | 8,467 | 0.968 | 1.087 | 1.028 |
| 2019 Nov. 30 | 2019 Dec. 2 | 15,817 | 15,685 | 0.965 | 1.052 | 1.008 |
| 2019 Dec. 2 | 2019 Dec. 4 | 20,771 | 19,586 | 1.022 | 1.099 | 1.061 |

This interim data table shows the number of new users appearing in each scorecard since a previous scorecard. For example, 7,131 new users appeared in treatment on the second day scorecard beyond the 9,328 users in treatment in the first day scorecard. The confidence intervals in this interim data table are based on an observed interim T/C ratio for each new group of users. In other words, the observed interim T/C ratio is a ratio of new users assigned to treatment to new users assigned to control.

FIG. 4C illustrates a plot 458 that the temporal analyzer may display on a graphical user interface 408c based on the interim data table. The plot 458 includes a line 428c illustrating the expected T/C ratio for the OCE. The plot 458 includes point 470a showing an observed T/C ratio for new users in the first day scorecard, point 470b showing an observed T/C ratio for new users in the second day scorecard, point 470c showing an observed T/C ratio for new users in the third day scorecard, point 470d showing an observed T/C ratio for new users in the fifth day scorecard, and point 470e showing an observed T/C ratio for new users in the seventh day scorecard. The plot 458 includes a confidence interval 460a using the observed T/C ratio of new users in the first day scorecard, a confidence interval 460b using the observed T/C ratio of new users in the second day scorecard, a confidence interval 460c using the observed T/C ratio of new users in the third day scorecard, a confidence interval 460d using the observed T/C ratio of new users in the fifth day scorecard, and a confidence interval 460e using the observed T/C ratio of new users in the seventh day scorecard.

The temporal analyzer may determine that an SRM exists in any interim group of users (any group of new users in a scorecard) whose confidence interval does not contain the expected T/C ratio. In other words, the temporal analyzer may determine that an SRM exists for new users in a scorecard whose confidence interval does not intersect with the line 428c.

The plot 458 indicates that the SRM occurred among users who were assigned to treatment or control between December 2 and December 4, which agrees with the result of the proportion test indicating a meaningfully different proportion of users was assigned to treatment in this group than was assigned to treatment in the fifth day scorecard.

In other examples, the temporal analyzer may determine that multiple groups of interim users have an SRM. In that case, a confidence interval for an observed T/C ratio of each such group may not include the expected T/C ratio.

In other examples, the temporal analyzer may determine that none of the interim groups have an SRM (i.e., all the interim confidence intervals include the expected T/C ratio). In that case, the temporal analyzer may determine that the SRM is a result of power issues. In other words, the temporal analyzer may determine that a root cause of the SRM existed from a beginning of an OCE but there was insufficient data to detect the SRM earlier in the OCE. When there is more data, there is more power and thus the temporal analyzer is able to detect an effect or presence of an SRM.

The procedure for constructing the confidence intervals for the interim users may be the same as for the cumulative data with the following differences. Rather than using the cumulative treatment and control counts that show up in the scorecards of various lengths, the temporal analyzer uses treatment and control counts of only new (i.e., interim) users. The temporal analyzer may use the significance level $\tilde{\alpha}=1-(1-\alpha)^{1/K}$, where K is the total number of scorecards in the experiment. The latter significance level adjustment is known as Šidák's correction, which ensures that an overall type I error rate in declaring an SRM using this multiple confidence interval approach is controlled at $\alpha$.

Figure 5:
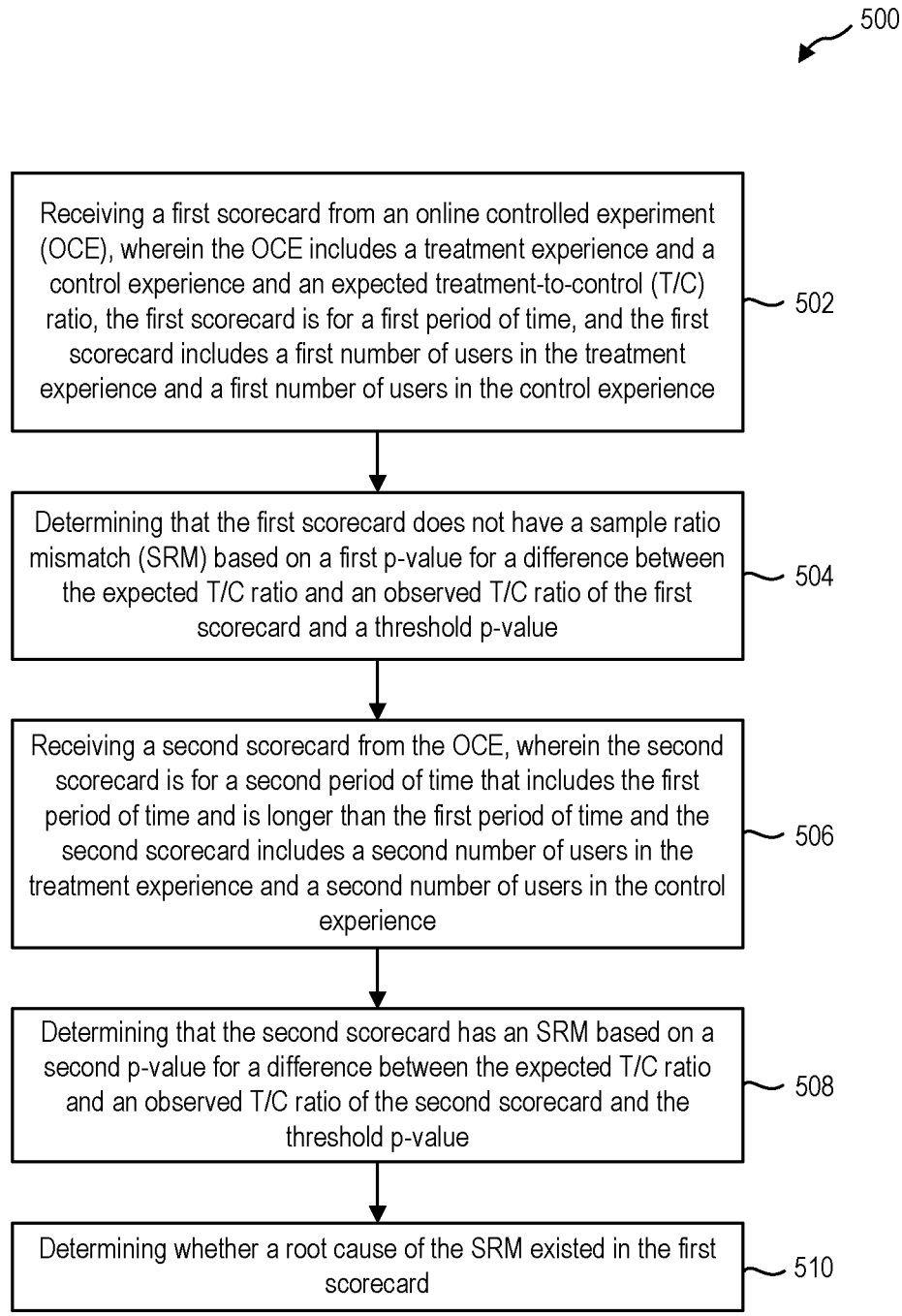
FIG. 5 illustrates an example method for determining whether a root cause of a sample ratio mismatch existed from a beginning of an online controlled experiment.

FIG. 5 illustrates an example method 500.

The method 500 may include receiving 502 a first scorecard from an online controlled experiment (OCE), wherein the OCE includes a treatment experience and a control experience and an expected treatment-to-control (T/C) ratio, the first scorecard is for a first period of time, and the first scorecard includes a first number of users in the treatment experience and a first number of users in the control experience.

The method 500 may include determining 504 that the first scorecard does not have a sample ratio mismatch (SRM) based on a first p-value for a difference between the expected T/C ratio and an observed T/C ratio of the first scorecard and a threshold.

The method 500 may include receiving 506 a second scorecard from the OCE, wherein the second scorecard is for a second period of time that includes the first period of time and is longer than the first period of time and the second scorecard includes a second number of users in the treatment experience and a second number of users in the control experience.

The method 500 may include determining 508 that the second scorecard has an SRM based on a second p-value for a difference between the expected T/C ratio and an observed T/C ratio of the second scorecard and the threshold. Determining 508 that the second scorecard has an SRM may be further based on the second p-value being less than the threshold. The second p-value may be determined using a chi-squared test. The threshold may be 0.0005.

The method 500 may include determining 510 whether a root cause of the SRM existed in the first scorecard. Determining 510 whether the root cause of the SRM existed in the first scorecard may include determining a difference of proportions between a proportion of users assigned to the treatment experience in the first scorecard and a proportion of users assigned to the treatment experience in the second scorecard. Determining 510 whether the root cause of the SRM existed in the first scorecard may include determining a confidence interval for the difference of proportions based on a significance level. Determining 510 whether the root cause of the SRM existed in the first scorecard may include determining whether the confidence interval for the difference of proportions contains zero. The significance level may be 0.01.

Figure 6:
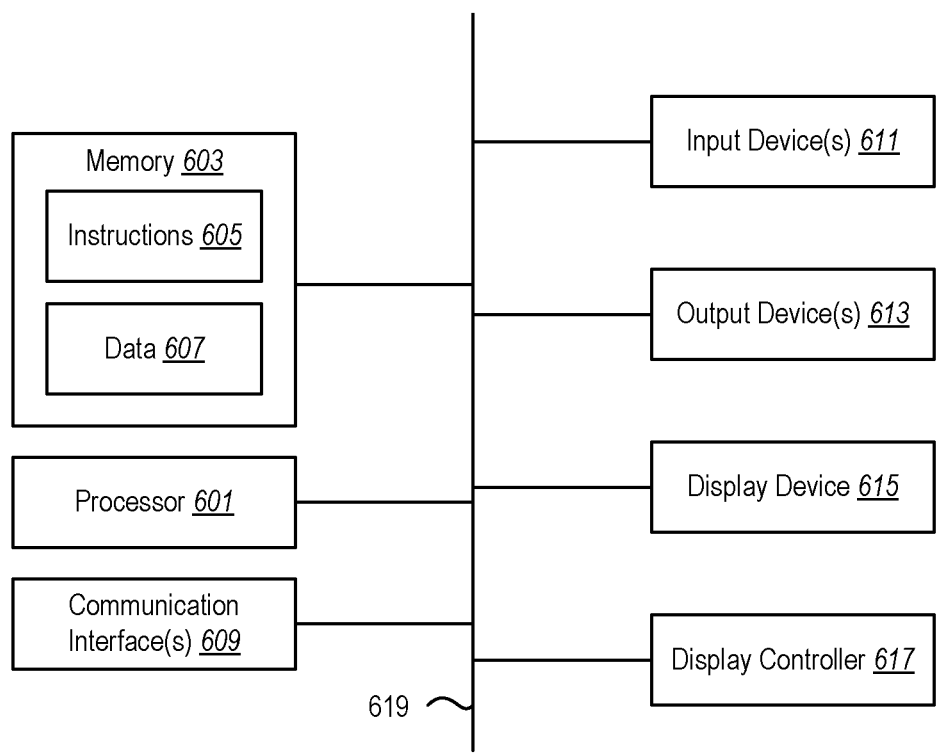
FIG. 6 illustrates example components of a computing device.

Reference is now made to FIG. 6. One or more computing devices 600 can be used to implement at least some aspects of the techniques disclosed herein. FIG. 6 illustrates certain components that can be included within a computing device 600.

The computing device 600 includes a processor 601 and memory 603 in electronic communication with the processor 601. Instructions 605 and data 607 can be stored in the memory 603. The instructions 605 can be executable by the processor 601 to implement some or all of the methods, steps, operations, actions, or other functionality that is disclosed herein. Executing the instructions 605 can involve the use of the data 607 that is stored in the memory 603. Unless otherwise specified, any of the various examples of modules and components described herein can be implemented, partially or wholly, as instructions 605 stored in memory 603 and executed by the processor 601. Any of the various examples of data described herein can be among the data 607 that is stored in memory 603 and used during execution of the instructions 605 by the processor 601.

Although just a single processor 601 is shown in the computing device 600 of FIG. 6, in an alternative configuration, a combination of processors (e.g., an Advanced RISC (Reduced Instruction Set Computer) Machine (ARM) and a digital signal processor (DSP)) could be used.

The computing device 600 can also include one or more communication interfaces 609 for communicating with other electronic devices. The communication interface(s) 609 can be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The computing device 600 can also include one or more input devices 611 and one or more output devices 613. Some examples of input devices 611 include a keyboard, mouse, microphone, remote control device, button, joystick, trackball, touchpad, and lightpen. One specific type of output device 613 that is typically included in a computing device 600 is a display device 615. Display devices 615 used with embodiments disclosed herein can utilize any suitable image projection technology, such as liquid crystal display (LCD), light-emitting diode (LED), gas plasma, electroluminescence, wearable display, or the like. A display controller 617 can also be provided, for converting data 607 stored in the memory 603 into text, graphics, and/or moving images (as appropriate) shown on the display device 615. The computing device 600 can also include other types of output devices 613, such as a speaker, a printer, etc.

The various components of the computing device 600 can be coupled together by one or more buses, which can include a power bus, a control signal bus, a status signal bus, a data bus, etc. For the sake of clarity, the various buses are illustrated in FIG. 6 as a bus system 619.

In accordance with one aspect of the present disclosure, a method is disclosed that includes receiving a first scorecard from an online controlled experiment (OCE). The OCE includes a treatment experience and a control experience and an expected proportion of users to be assigned to the treatment experience. The first scorecard is for a first period of time, and the first scorecard includes a first number of users in the treatment experience and a first number of users in the control experience. The method further includes determining that the first scorecard does not have a sample ratio mismatch (SRM) based on a threshold and a first p-value. The first p-value is based on a difference between the first number of users in the treatment experience and a first expected number of users in the treatment experience. The first expected number of users in the treatment experience is based on the expected proportion of users to be assigned to the treatment experience and a sum of the first number of users in the treatment experience and the first number of users in the control experience. The method further includes receiving a second scorecard from the OCE. The second scorecard is for a second period of time that includes the first period of time and is longer than the first period of time and the second scorecard includes a second number of users in the treatment experience and a second number of users in the control experience. The method further includes determining that the second scorecard has an SRM based on the threshold and a second p-value. The second p-value is based on a difference between the second number of users in the treatment experience and a second expected number of users in the treatment experience. The second expected number of users in the treatment experience is based on the expected proportion of users to be assigned to the treatment experience and a sum of the second number of users in the treatment experience and the second number of users in the control experience. The method further includes determining whether a root cause of the SRM in the second scorecard existed in the first scorecard based on a proportion of users assigned to the treatment experience in the first scorecard and a proportion of users assigned to the treatment experience in the second scorecard.

Determining that the second scorecard has the SRM may be further based on the second p-value being less than the threshold.

The second p-value may be determined using a chi-squared test, a 1-sample proportion test, or a binomial test.

The threshold may be 0.0005.

Determining whether the root cause of the SRM in the second scorecard existed in the first scorecard may include determining a difference of proportions between the proportion of users assigned to the treatment experience in the first scorecard and the proportion of users assigned to the treatment experience in the second scorecard, determining a confidence interval for the difference of proportions based on a significance level, and determining whether the confidence interval for the difference of proportions contains zero.

The significance level may be 0.01.

Determining whether the root cause of the SRM in the second scorecard existed in the first scorecard may include determining that the root cause of the SRM in the second scorecard existed in the first scorecard when the confidence interval for the difference of proportions contains zero.

Determining whether the root cause of the SRM in the second scorecard existed in the first scorecard may include determining that the root cause of the SRM in the second scorecard exists in new users after the first scorecard when the confidence interval for the difference of proportions does not contain zero.

The method may further include receiving a third scorecard from the OCE. The third scorecard may be for a third period of time that includes the second period of time and is longer than the second period of time and the third scorecard may include a third number of users in the treatment experience and a third number of users in the control experience. The method may further include determining a first interim confidence interval for an observed first interim treatment-to-control (T/C) ratio. The first interim confidence interval may be based on the first number of users in the treatment experience, the first number of users in the control experience, an expected T/C ratio of the OCE, and the threshold. The method may further include determining a second interim confidence interval for an observed second interim T/C ratio. The observed second interim T/C ratio is based on users in the second scorecard but not in the first scorecard. The method may further include determining a third interim confidence interval for an observed third interim T/C ratio. The observed second interim T/C ratio is based on users in the third scorecard but not in the second scorecard.

The method may further include determining that the first interim confidence interval includes the expected T/C ratio, determining that the second interim confidence interval does not include the expected T/C ratio, determining that the third interim confidence interval does not include the expected T/C ratio, determining that the root cause of the SRM in the second scorecard did not exist in the first scorecard, and determining that the root cause of the SRM in the second scorecard exists in users that are not in the first scorecard but are in the third scorecard.

The method may further include determining that the first interim confidence interval includes the expected T/C ratio, determining that the second interim confidence interval includes the expected T/C ratio, determining that the third interim confidence interval includes the expected T/C ratio, and determining that the root cause of the SRM in the second scorecard existed in the first scorecard.

In accordance with another aspect of the present disclosure, a method is disclosed that includes receiving a first scorecard from an online controlled experiment (OCE). The OCE includes a treatment experience and a control experience and an expected treatment-to-control (T/C) ratio, the first scorecard is for a first period of time, and the first scorecard includes a first number of users in the treatment experience and a first number of users in the control experience. The method further includes determining an observed first T/C ratio for the first scorecard based on the first number of users in the treatment experience and the first number of users in the control experience. The method further includes determining a first confidence interval for the observed first T/C ratio based on the expected T/C ratio and a threshold and displaying, on a graphical user interface, a marker representing the observed first T/C ratio. The method further includes displaying, on the graphical user interface, a line representing the first confidence interval.

The method may further include displaying, on the graphical user interface, a line representing the expected T/C ratio.

The line representing the first confidence interval may intersect the line representing the expected T/C ratio.

The method may further include receiving a second scorecard from the OCE. The second scorecard may be for a second period of time, the second scorecard may include a second number of users in the treatment experience and a second number of users in the control experience, and the second period of time may include the first period of time and is longer than the first period of time. The method may further include determining an observed second T/C ratio for the second scorecard based on the second number of users in the treatment experience and the second number of users in the control experience. The method may further include determining a second confidence interval for the observed second T/C ratio based on the expected T/C ratio and the threshold. The method may further include displaying, on the graphical user interface, a marker representing the observed second T/C ratio and a line representing the second confidence interval.

The line representing the second confidence interval may not intersect the line representing the expected T/C ratio.

In accordance with another aspect of the present disclosure, a method is disclosed that includes receiving a scorecard from an online controlled experiment (OCE). The OCE includes a treatment experience and a control experience and an expected proportion of users to be assigned to the treatment experience. The scorecard includes a number of users in the treatment experience and a number of users in the control experience, and the scorecard includes a first segment and a second segment. The method further includes determining that the scorecard has a sample ratio mismatch (SRM) based on a threshold and a p-value for a difference between the number of users in the treatment experience for the scorecard and an expected number of users in the treatment experience. The method further includes determining whether the first segment has an SRM based on the threshold and a first segment p-value for a difference between an observed number of first segment users in the treatment experience and an expected number of first segment users in the treatment experience. The expected number of first segment users in the treatment experience is based on the expected proportion of users to be assigned to the treatment experience and a total number of users in the first segment. The method further includes determining whether the second segment has an SRM based on the threshold and a second segment p-value for a difference between an observed number of second segment users in the treatment experience and an expected number of second segment users in the treatment experience. The expected number of second segment users in the treatment experience is based on the expected proportion of users to be assigned to the treatment experience and a total number of users in the second segment.

The method may further include determining that the first segment has an SRM because the first segment p-value is less than the threshold and determining that the second segment does not have an SRM because the second segment p-value is not less than the threshold.

The method may further include displaying, on a graphical user interface, a first cell representing the first segment. The first cell may have a first color. The method may further include displaying, on the graphical user interface, a second cell representing the second segment, wherein the second cell has a second color different from the first color.

The first segment may include more users than the second segment and the first cell has an area larger than an area of the second cell.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for determining a time period of a root cause of a sample ratio mismatch (SRM) in an online controlled experiment (OCE), wherein the OCE comprises a treatment experience and a control experience, the OCE is configured to compute scorecards according to a pre-defined schedule, the method comprising:
    receiving a first scorecard from the OCE, wherein the first scorecard was computed by the OCE, the OCE includes an expected proportion of users to be assigned to the treatment experience, the first scorecard is for a first period of time, and the first scorecard includes a first proportion of users in the treatment experience;
    determining that the first scorecard does not have the SRM based on a threshold and a first p-value, wherein the first p-value is based on the first proportion of users in the treatment experience and the expected proportion of users to be assigned to the treatment experience;
    receiving a second scorecard from the OCE, wherein the second scorecard is for a second period of time that includes the first period of time and is longer than the first period of time, the second scorecard was computed by the OCE, and the second scorecard includes a second proportion of users in the treatment experience, and wherein the second scorecard is more expensive to compute than the first scorecard;
    determining that the second scorecard has the SRM based on the threshold and a second p-value, wherein the second p-value is based on the second proportion of users in the treatment experience and the expected proportion of users to be assigned to the treatment experience;
    determining that the root cause of the SRM in the second scorecard existed in the first scorecard based on the first proportion of users in the treatment experience in the first scorecard and the second proportion of users in the treatment experience in the second scorecard; and
    in response to determining that the root cause of the SRM in the second scorecard existed in the first scorecard and prior to completing the OCE, stopping the OCE from computing additional scorecards of the OCE subsequent to the second scorecard, wherein the additional scorecards are more expensive to compute than each of the first scorecard and the second scorecard.

2. The method of claim 1, wherein determining that the second scorecard has the SRM is further based on the second p-value being less than the threshold and wherein the second p-value is determined using a chi-squared test, a 1-sample proportion test, a binomial test, or a delta method-based test.

3. The method of claim 2, wherein the threshold is 0.0005.

4. The method of claim 1, wherein determining whether the root cause of the SRM in the second scorecard existed in the first scorecard comprises:
    determining a difference of proportions between the proportion of users assigned to the treatment experience in the first scorecard and the proportion of users assigned to the treatment experience in the second scorecard;
    determining a confidence interval for the difference of proportions based on a significance level; and
    determining whether the confidence interval for the difference of proportions contains zero.

5. The method of claim 4, wherein the significance level is 0.01.

6. The method of claim 4, wherein stopping the OCE from computing additional scorecards comprises:
    stopping the OCE from computing the additional scorecard based on the confidence interval for the difference of proportions containing zero.

7. A method for determining and presenting an indication of a sample ratio mismatch (SRM) for a scorecard of an online controlled experiment (OCE), the method comprising:
- receiving a first scorecard from the OCE, wherein the OCE includes a treatment experience, a control experience, and an expected treatment-to-control (T/C) ratio, and wherein the first scorecard is for a first period of time;
- determining an observed first T/C ratio for the first scorecard;
- determining a first confidence interval using the observed first T/C ratio based on the expected T/C ratio and a threshold, the first confidence interval determined using a difference between the observed first T/C ratio and the expected T/C ratio;
- displaying, on a graphical user interface of a display screen, a marker representing the observed first T/C ratio;
- displaying, on the graphical user interface of the display screen, a line representing the first confidence interval;
- displaying, on the graphical user interface of the display screen, a line representing the expected T/C ratio, wherein whether the line representing the first confidence interval intersects with the line representing the expected T/C ratio indicates whether the first scorecard has an SRM;
- determining, based on the line representing the first confidence interval not intersecting the line representing the expected T/C ratio, that the SRM exists in the first scorecard; and
- before completing a second scorecard of the OCE, the second scorecard more expensive to compute than the first scorecard, stopping the OCE based on whether the first scorecard has an SRM.

8. The method of claim 7, wherein the line representing the first confidence interval does not intersect the line representing the expected T/C ratio and wherein the graphical user interface indicates that the first scorecard has the SRM.

9. The method of claim 7, wherein the line representing the first confidence interval intersects the line representing the expected T/C ratio and wherein the graphical user interface indicates that the first scorecard does not have the SRM.

10. A method comprising:
- detecting a sample ratio mismatch (SRM) in two online controlled experiments (OCEs) for a product;
- determining that the two OCEs use a same assignment mechanism and data pipeline;
- analyzing a first segment and a second segment included in the two OCEs for the product to determine segment SRMs, the first segment representing a first set of participants sharing a first attribute value and the second segment representing a second set of participants sharing a second attribute value, with the first attribute value being different from the second attribute value, and wherein each of the first segment and the second segment comprises a combination including both participants assigned to an experiment variant of the product and participants assigned to a control variant of the product;
- determining, based on a determination that the first segment corresponding to the first attribute value and the second segment corresponding to the second attribute value both include a segment SRM, that a root cause of the SRM is widespread within recent OCEs for the product; and
- before the two OCEs each compute a subsequent scorecard, stopping the two OCEs from each running the subsequent scorecard based on the root cause of the SRM being widespread within the recent OCEs for the product, wherein the subsequent scorecard is more expensive to compute than a prior scorecard.

11. The method of claim 10, wherein determining whether the root cause of the SRM is widespread further comprises determining a proportion of scorecards in the recent OCEs that have the SRM.

12. The method of claim 11, further comprising:
- determining that the root cause of the SRM is widespread based on a determination confidence level for both segment SMRs being above a threshold level.

13. The method of claim 12, further comprising determining that the root cause of the SRM is widespread based on determining that the first segment and the second segment both include segment SRMs that suddenly identify the SRM.

14. The method of claim 1, wherein the treatment experience represents a potential change or modification to a product.

15. The method of claim 1, wherein the p-value is based on a chi-squared test.

16. The method of claim 1, wherein the second scorecard is cumulative of the first scorecard.

17. The method of claim 7, wherein the second scorecard is cumulative of the first scorecard.

18. The method of claim 7, further comprising displaying the line representing the first confidence interval in a color indicating the SRM.

19. The method of claim 10, wherein each subsequent scorecard is cumulative of prior scorecards.

20. The method of claim 10, wherein at least one segment of the two OCEs for the product does not include the SRM.

* * * * *